US012716397B2

(12) United States Patent
Pedretti et al.

(10) Patent No.: US 12,716,397 B2
(45) Date of Patent: Aug. 25, 2026

(54) ENERGY STORAGE TOWER

(71) Applicant: SOM-EV Newco LLC, New York, NY (US)

(72) Inventors: Andrea Pedretti, Thousand Oaks, CA (US); Jose Euclides Andrade, Pasadena, CA (US); William Frazier Baker, Jr., Evanston, IL (US)

(73) Assignee: SOM-EV, NEWCO LLC, New York, NY (US)

( * ) Notice: Subject to any disclaimer, the term of this patent is extended or adjusted under 35 U.S.C. 154(b) by 0 days.

(21) Appl. No.: 19/379,001

(22) Filed: Nov. 4, 2025

(65) Prior Publication Data

US 2026/0063100 A1 Mar. 5, 2026

Related U.S. Application Data

(63) Continuation of application No. 19/194,563, filed on Apr. 30, 2025.

(Continued)

(51) Int. Cl.
*F03B 13/06* (2006.01)

(52) U.S. Cl.
CPC ........ *F03B 13/06* (2013.01); *F05B 2220/706* (2013.01); *F05B 2260/422* (2020.08)

(58) Field of Classification Search
CPC .... F03B 13/06; F03B 1/00; F03B 1/02; F03B 1/04; F03B 7/00; F03B 7/003;

(Continued)

(56) References Cited

U.S. PATENT DOCUMENTS

| | | | | |
|---|---|---|---|---|
| 6,051,892 | A * | 4/2000 | Toal, Sr. | F03B 17/005 290/43 |
| 6,359,347 | B1 * | 3/2002 | Wolf | F03B 13/086 290/43 |

(Continued)

FOREIGN PATENT DOCUMENTS

| | | | |
|---|---|---|---|
| CN | 102322385 | A | 1/2012 |
| CN | 109147514 | A | 1/2019 |

(Continued)

OTHER PUBLICATIONS

International Search Report and Written Opinion dated Nov. 7, 2025 from corresponding PCT International Application No. PCT/US2025/027143.

*Primary Examiner* — Charles Reid, Jr.
*Assistant Examiner* — Charles H Reid
(74) *Attorney, Agent, or Firm* — DLA Piper LLP (US)

(57) ABSTRACT

An energy storage tower can include an upper floor section with one or more floors. A pump, a turbine, a turbine-pump, or a plurality of turbine pumps on, below or proximate the ground can be hydraulically connected with each of the floors in the upper floor section. To store energy, water can be pumped from a lower elevation, to one or more of the floors in the upper floor section via one or more pipes, and one or more valves can be selectively closed to store the water. To generate electricity, one of more of the valves can be selectively opened to allow water to flow from the upper floor section to the lower elevation under force of gravity. The water can flow past and rotate a turbine or turbine pump to generate electricity via a generator electrically connected to the turbine or turbine pump.

20 Claims, 33 Drawing Sheets

Related U.S. Application Data

(60) Provisional application No. 63/642,500, filed on May 3, 2024.

(58) Field of Classification Search
CPC .. F03B 7/006; F03B 9/00; F03B 9/005; F05B 2220/706; F05B 2260/422; Y02E 10/20
USPC .............................................................. 290/54
See application file for complete search history.

(56) References Cited

U.S. PATENT DOCUMENTS

| | | | | |
|---|---|---|---|---|
| 6,861,766 | B2 * | 3/2005 | Rembert | F03D 9/13 290/43 |
| 8,344,537 | B2 * | 1/2013 | Angulo Valpreda | F03B 17/04 290/54 |
| 8,736,097 | B1 * | 5/2014 | Schrader | H02P 9/04 290/43 |
| 8,823,195 | B2 | 9/2014 | Legacy | |
| 2009/0115189 | A1 * | 5/2009 | Lin | F03B 17/005 290/43 |
| 2012/0074703 | A1 * | 3/2012 | Lin | F03B 17/005 290/54 |
| 2012/0299304 | A1 * | 11/2012 | Al-Saffar | F03B 17/005 415/916 |
| 2022/0213860 | A1 | 7/2022 | Kim | |
| 2022/0364539 | A1 | 11/2022 | Schmidt-Böcking et al. | |

FOREIGN PATENT DOCUMENTS

| | | | |
|---|---|---|---|
| DE | 202010010695 | U1 | 12/2010 |
| DE | 102012107258 | A1 | 2/2014 |

* cited by examiner

100

ENERGY STORAGE TOWER

CROSS REFERENCE TO RELATED APPLICATIONS

This application is a continuation of U.S. patent application Ser. No. 19/194,563, filed Apr. 30, 2025, which claims priority to U.S. Provisional Application No. 63/642,500, filed May 3, 2024, which are both hereby incorporated by reference in their entireties.

BACKGROUND

The present disclosure is directed gravity based energy storage, and more particularly to a tower (e.g., building) with gravity based energy storage.

DESCRIPTION OF THE RELATED ART

There is an increased focus on reducing the use of fossil fuels to reduce the greenhouse gas emissions to the atmosphere. Power generation from renewable energy sources (e.g., solar power, wind power, hydroelectric power, biomass, etc.) continues to grow. However, many of these renewable energy sources (e.g., solar power, wind power) are intermittent an unpredictable, limiting the amount of electricity that can be delivered to the grid from intermittent renewable energy sources.

SUMMARY

Accordingly, there is a need for improved system to capture electricity generated by renewable energy sources for predictable delivery to the electric grid.

In accordance with one aspect of the disclosure, an energy storage tower is provided. The tower can have an upper floor section with one or more floors (e.g., multiple floors). A pump, a turbine, a turbine-pump, or a plurality of turbine pumps on, below or proximate the ground can be hydraulically connected (e.g., via pipes) with each of the floors in the upper floor section. To store energy (as potential energy), water can be pumped (e.g., by one or more pumps or one or more turbine pumps) from a lower elevation (e.g., a reservoir outside the tower hydraulically connected to the tower, one or more floors in a lower section of the tower) to one or more of the floors in the upper floor section via one or more pipes, and one or more valves selectively closed to store the water in said one or more floors. The pump, turbine, turbine-pump, or the plurality of turbine pumps can be positioned within or at the bottom of the reservoir. To generate electricity, one of more of the valves can be selectively opened to allow water to flow from said one or more floors in the upper floor section (via the one or more pipes) to the lower elevation under force of gravity, said water flowing past and rotating a turbine or turbine pump to generate electricity via a generator electrically connected to the turbine or turbine pump.

In accordance with one aspect of the disclosure, an energy storage tower is provided. The tower can have an upper floor section, a lower floor section and an intermediate floor section. The upper floor section can have a plurality of floors. The lower floor section can have a plurality of floors (e.g., the same number of floors or a similar number of floors as the upper floor section). The intermediate floor section can have a plurality of floors. In one example, the intermediate floor section houses residential or commercial unis (e.g., computer datacenters). A pump, a turbine, a turbine-pump, or a plurality of turbine pumps on, below or proximate the ground can be hydraulically connected (e.g., via pipes) with each of the floors in the upper floor section and each of the floors in the lower floor section. The pump, turbine, turbine-pump, or the plurality of turbine pumps can be positioned below a floor in the lower floor section or in or at the bottom of the reservoir. Each floor in the upper floor section and each floor in the lower floor section can have a valve operable between an open state to hydraulically connect said floor with the pump, turbine, turbine-pump, or plurality of turbine pumps and a closed state to hydraulically disconnect the floor from the pump, turbine, turbine-pump, or plurality of turbine pumps. Each floor or module (e.g., in the upper floor section) can be selectively filled with water (when its valve is open) by the pump or turbine pump, and the valve then closed to retain the water in the floor, and so that the water pressure on the walls of the floor or module is limited to the single floor height. Water from a floor (e.g., in the upper floor section) can be released by opening its corresponding valve, allowing the water to exit the floor (in the upper floor section) and flow to the turbine or turbine pump (under force of gravity), rotating the turbine or turbine pump to generate electricity, and to a floor in the lower floor section. In this manner, energy can be stored (as potential energy) in the water that is directed by the pump or turbine pump from one or more floors of the lower floor section to one or more the floors of the upper floor section, and electricity can be generated (by rotating the turbine generator or turbine pump) via the water that is directed (via force of gravity) from one or more floors in the upper floor section to one or more floors in the lower floor section. The pump, turbine, turbine-pump, or a plurality of turbine pumps operate with the same pressure differential between the floor in the upper floor section and the corresponding floor in the lower floor section. In one example, the tower is cylindrical with an annular cross-section.

In accordance with another aspect of the disclosure, an energy storage tower is provided. The tower can have a plurality of floors. A pump or turbine pump on or proximate the ground can be hydraulically connected (e.g., via pipes) with each of the floors of the tower. The pump or turbine pump (or a plurality of pumps or turbine pumps) can also be positioned below a floor of the plurality of floors in the lower section of the tower. Each floor in can have a valve operable between an open state to hydraulically connect said floor with the pump or turbine pump and a closed state to hydraulically disconnect the floor from the pump or turbine pump. Each floor can be selectively filled with water (when its valve is open) by the pump or turbine pump, and the valve then closed to retain the water in the floor, and so that the water pressure on the walls of the floor is limited to the single floor height. Water from a floor (e.g., in an upper section of the tower) can be released by opening its corresponding valve, allowing the water to exit the floor and flow to the turbine or turbine pump (under force of gravity), rotating the turbine or turbine pump to generate electricity, and to a floor in a lower section of the tower. In this manner, energy can be stored (as potential energy) in the water that is directed by the pump or turbine pump from one or more floors of the lower section of the tower to one or more the floors of the upper section of the tower, and electricity can be generated (by rotating the turbine generator or turbine pump) via the water that is directed (via force of gravity) from one or more floors in the upper section of the tower to one or more floors in the lower section of the tower. In one example, the turbine pump can operate with the same pressure differential between the floor in the upper section and the corresponding floor in the lower section. In one example, the tower is a cylindrical hollow tower.

In some aspects, the techniques described herein relate to an energy storage tower, including: a lower section including a plurality of floors or modules, each floor of the lower section configured to be filled with a liquid, an upper section including a plurality of floors or modules, each floor of the upper section configured to be selectively filled with the liquid, an intermediate section vertically between the lower section and the upper section, and a turbine pump or a plurality of turbine pumps selectively hydraulically connected to the floors in the lower section and to the floors in the upper section, the turbine pump operable to pump liquid from one or more floors in the lower section to one or more corresponding floors in the upper section to store energy as potential energy, and operable to generate electricity from a flow of the liquid from one or more floors in the upper section to one or more corresponding floors in the lower section under force of gravity.

In accordance with another aspect of the disclosure, an energy storage tower is provided. The energy storage tower can include a lower section. The energy storage tower can include an upper section including a plurality of floors. Each floor of the plurality of floors can be configured to be selectively filled with a liquid. The energy storage tower can include a set of pipes hydraulically coupling the lower section and the plurality of floors. The energy storage tower can include a plurality of pumps positioned at the lower section and hydraulically coupled to the set of pipes. The energy storage tower can include a turbine positioned at the lower section and hydraulically coupled to the set of pipes. The plurality of pumps can be operable to pump the liquid from the lower section to one or more of the plurality of floors to store energy as potential energy. The turbine can be operable to generate electricity from a flow of the liquid through the set of pipes from the plurality of floors to the lower section under a force of gravity.

In accordance with another aspect of the disclosure, an energy storage tower is provided. The energy storage tower can include a lower section including a first plurality of modules. Each module of the first plurality of modules can be configured to be filled with a liquid. The energy storage tower can include an upper section having a second plurality of modules. Each module of the second plurality of modules can be configured to be selectively filled with the liquid. A set of pipes can hydraulically couple the first plurality of modules and the second plurality of modules. Each pipe of the set of pipes can extend to each module of the first plurality of modules and the second plurality of modules. A plurality of pumps can be hydraulically connected to the first plurality of modules. A plurality of turbines can be positioned vertically above each module of the first plurality of modules and hydraulically coupled to the set of pipes. The plurality of pumps can be operable to pump the liquid from each module of the first plurality of modules to the second plurality of modules to store energy as potential energy. The plurality of turbines can be operable to generate electricity from a flow of the liquid through the set of pipes from the second plurality of modules to the first plurality of modules under a force of gravity.

In accordance with another aspect of the disclosure, an energy storage tower is provided. The energy storage tower can include a lower section including a first plurality of modules. Each module of the first plurality of modules can be configured to be filled with a liquid. The energy storage tower can include an upper section including a second plurality of modules, each module of the second plurality of modules is configured to be selectively filled with the liquid. The energy storage tower can include a set of pipes hydraulically coupling the first plurality of modules and the second plurality of modules. Each pipe of the set of pipes can extend to each module of the first plurality of modules and the second plurality of modules. Each pipe of the set of pipes can be hydraulically coupled to a turbine of a plurality of turbines. A plurality of pumps can be hydraulically connected to the first plurality of modules. The plurality of pumps can be operable to pump the liquid from each module of the first plurality of modules to the second plurality of modules to store energy as potential energy. Each turbine can be operable to generate electricity from a flow of the liquid through the set of pipes from the second plurality of modules to the first plurality of modules under a force of gravity.

DETAILED DESCRIPTION

Figure 1:
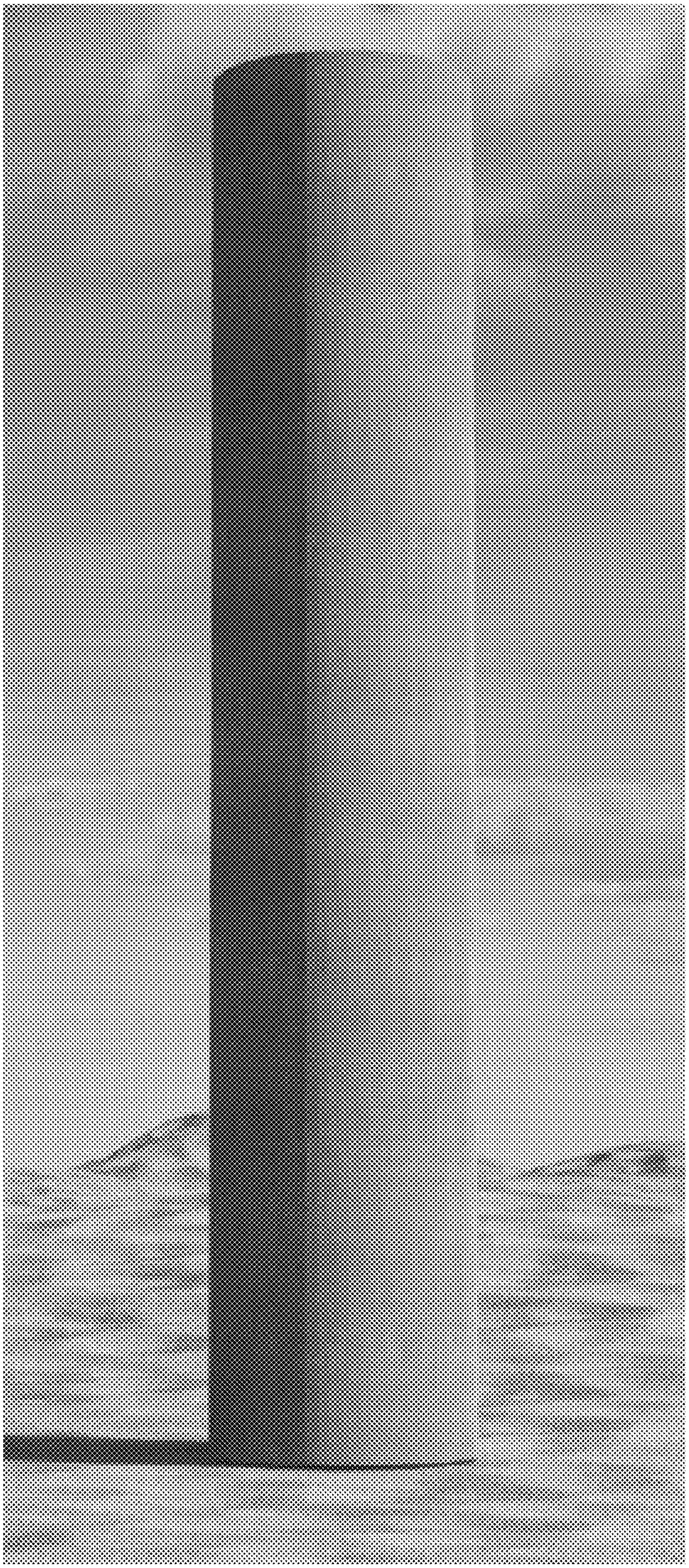
FIG. 1 is a schematic view of an energy storage tower.
Figure 2:
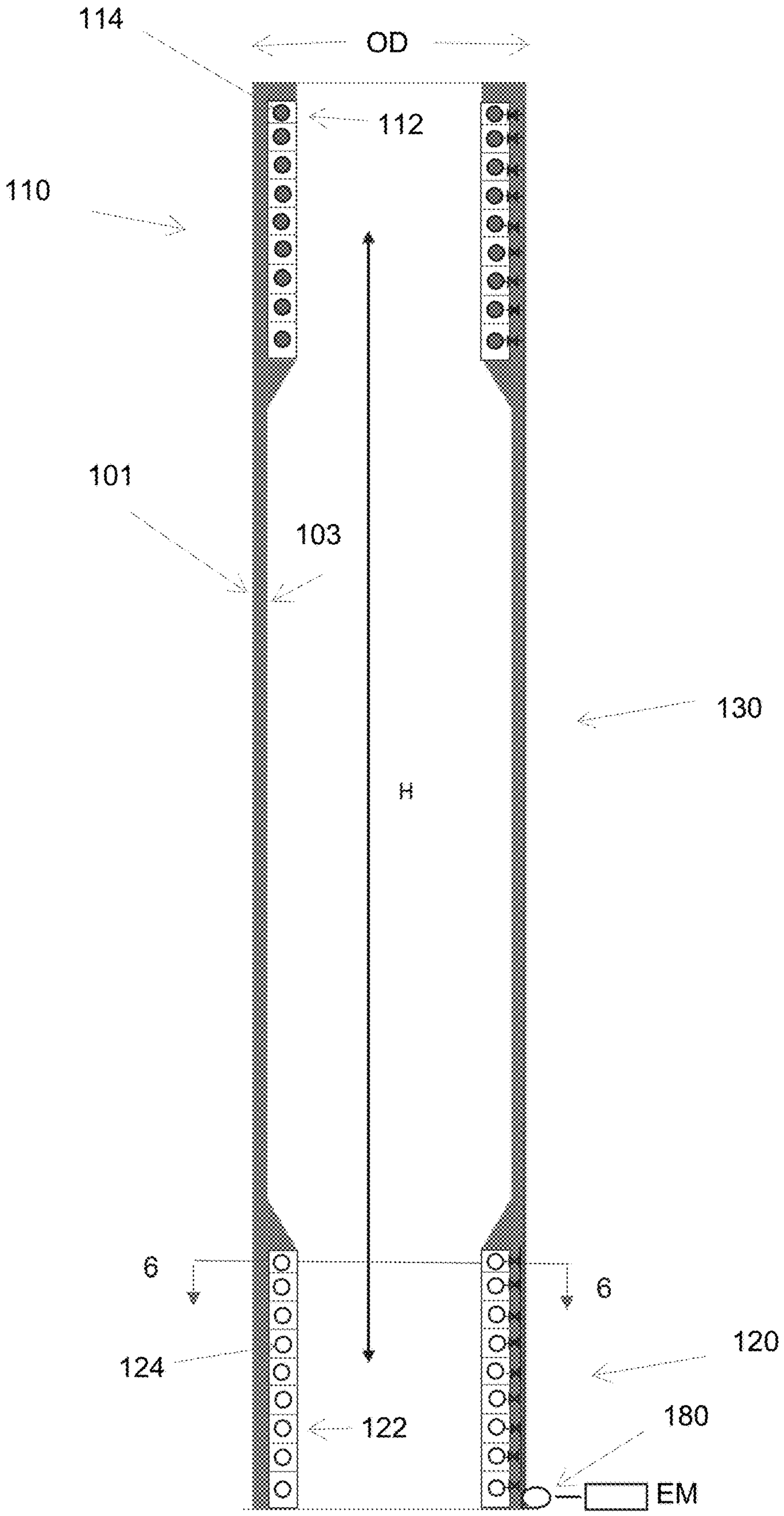
FIG. 2 is a schematic cross-sectional view of the tower along the height of the energy storage tower.
Figure 3:
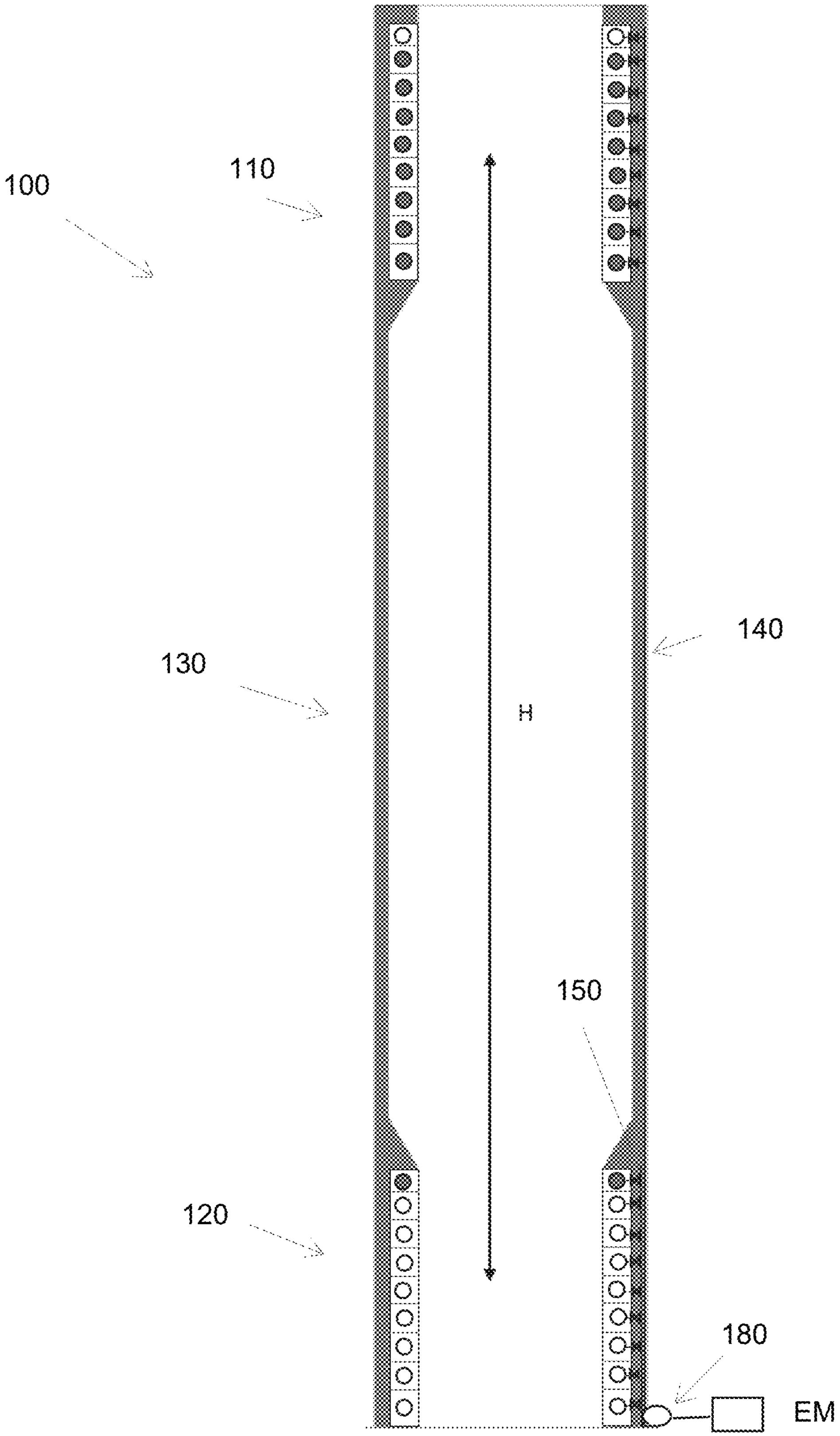
FIG. 3 is a schematic cross-sectional view of the tower along the height of the energy storage tower.
Figure 4:
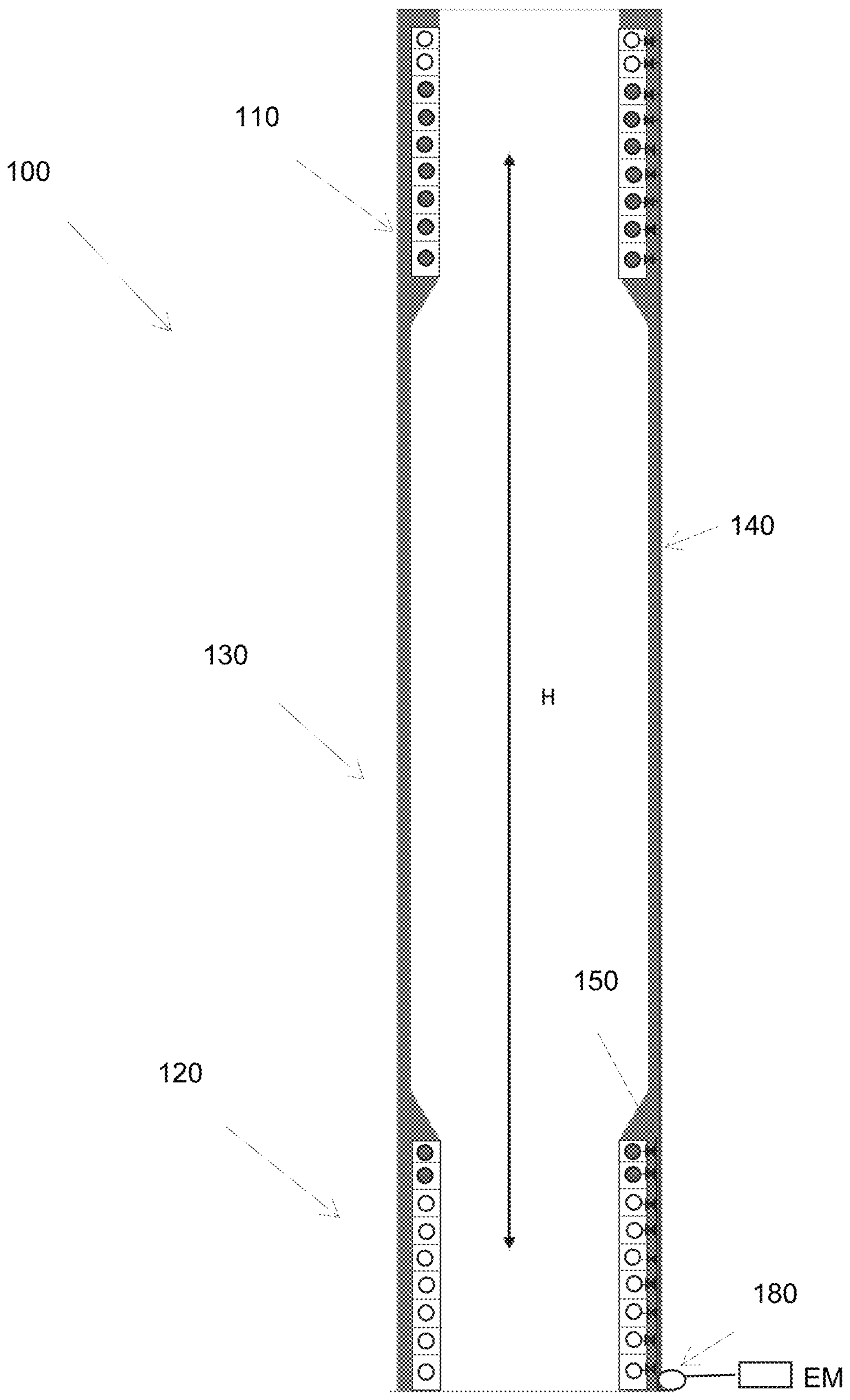
FIG. 4 is a schematic cross-sectional view of the tower along the height of the tower.
Figure 5A:
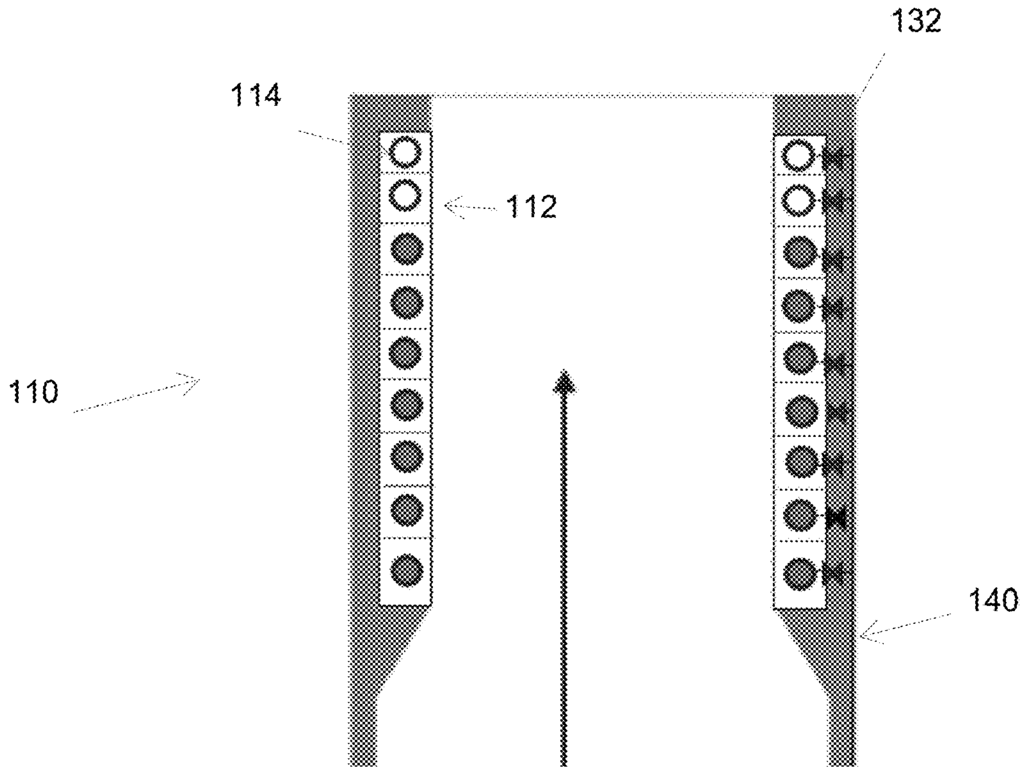
FIG. 5A is a schematic enlarged view of an upper section of the energy storage tower.
Figure 5B:
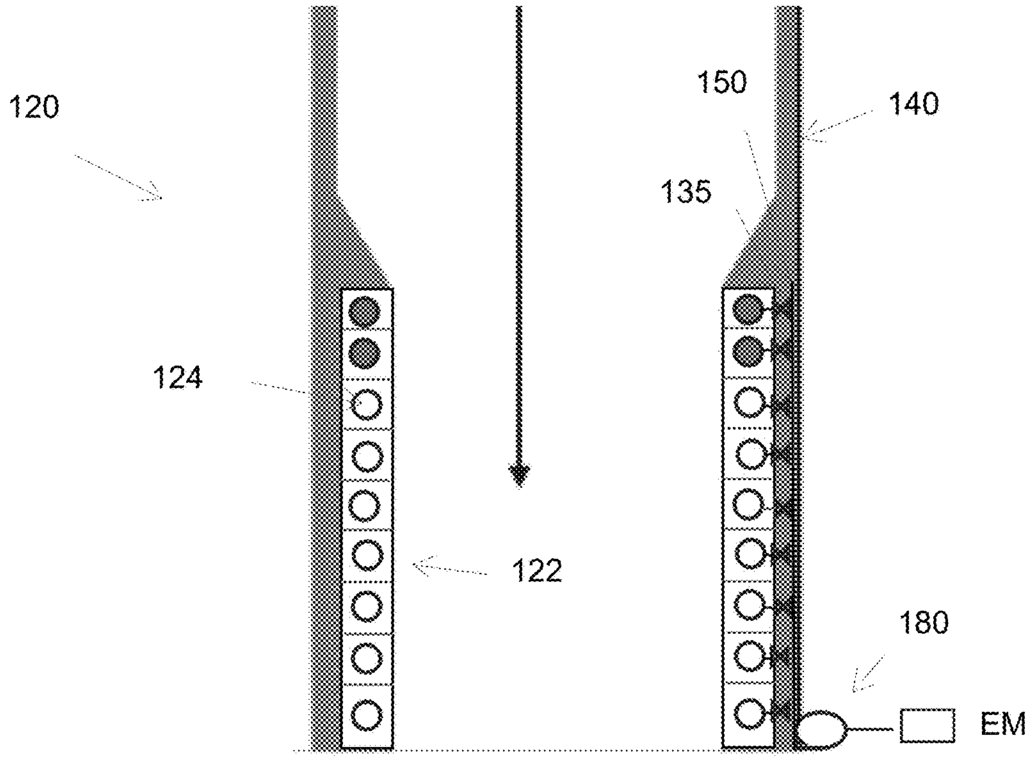
FIG. 5B is a schematic enlarged view of a lower section of the energy storage tower.

FIG. 1 shows an energy storage tower 100 (e.g., a single tower, hereafter the "tower") and FIGS. 2-4 show cross-sections of the tower 100 along the height H of the tower 100. The tower 100 optionally has a hollow cylindrical shape (e.g., tower body) with an annular cross-section and extends between an outer surface or wall 101 and an inner surface or wall 103. One of skill in the art will recognize that FIGS. 2-4 show a cross-section of the tower 100 along its length and that the body of the tower 100 is provided by rotating the image shown about its longitudinal axis. In another example, the tower 100 can have an oval cross-sectional shape. In another example, the tower 100 can have a polygonal cross-sectional shape.

In one example, the tower 100 can have a height H of 700 meters and have an outer diameter OD of 140 meters. In one example, the tower 100 can have a height H of 1 kilometer. However, the tower 100 can have other suitable heights H. The tower 100 can be made of concrete (e.g., steel-reinforced concrete). The tower 100 can have an upper section 110, a lower section 120 vertically below the upper section 110, and an intermediate section 130 vertically between the upper section 110 and the lower section 120. The upper section 110 can have a plurality of floors or modules 112, and the lower section 120 can have a plurality of floors or modules 122 (e.g., the lower section 120 can have the same number of floors or modules as the upper section 110). In one example, the intermediate section 130 has no discrete floors. In another example, the intermediate section 130 has a plurality of floors.

Figure 6:
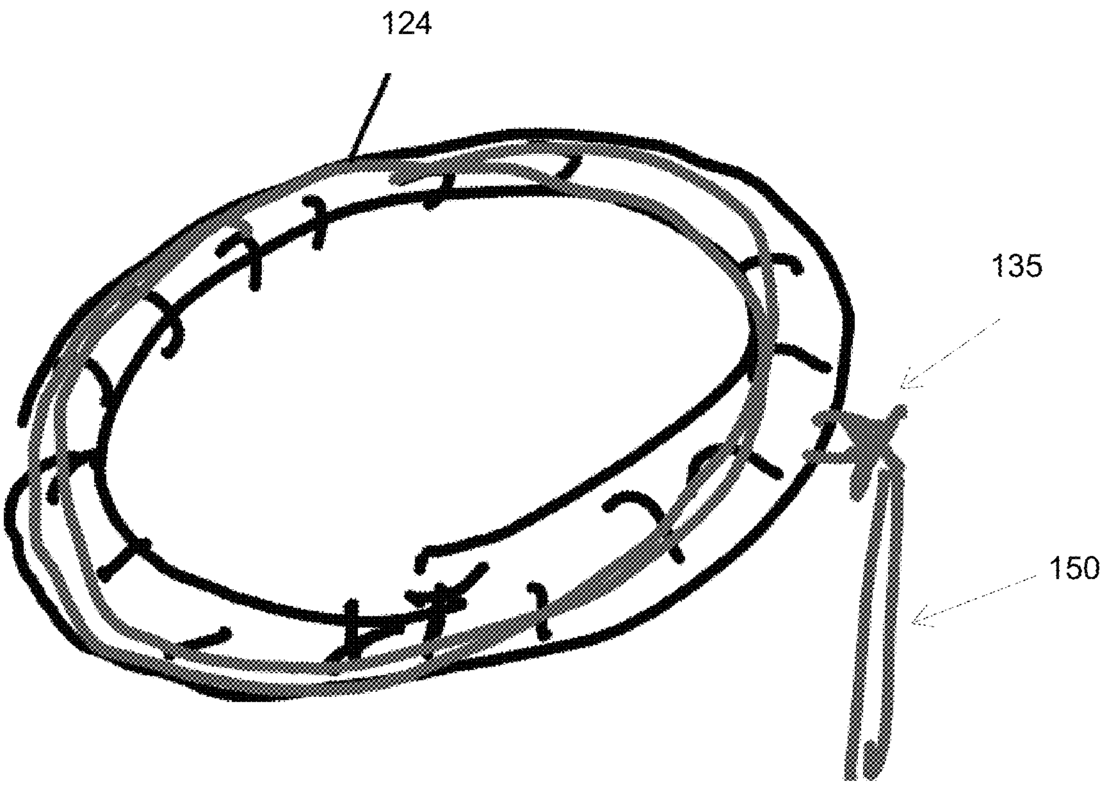
FIG. 6 is a schematic perspective view of a floor in the energy storage tower, viewed along line 6-6 in FIG. 2.

With reference to FIGS. 2-5B, each of the floors or modules 112, 122 can hold a liquid (e.g., water); that is, each of the floors 112, 122 can be filled with the liquid (e.g., with water). In one example, each of the floors 112, 122 houses a pipe 114, 124, respectively. The pipe 114, 124 can also be a chamber which can be fillable with water. Additionally, the pipe 114, 124 can be selectively filled with water, as further discussed below. In the illustrated example, where the tower 100 has a hollow cylindrical shape, the pipe 114, 124 can be circular or ring-shaped, as shown in FIG. 6. Each of the floors or modules 112 of the upper section 110 (e.g. each of the pipes 114 of the floors 112) can connect to a first header pipe 140 via a valve 132 that is actuatable (e.g., by an electronic controller having one or more processors) between an open position that hydraulically connects the corresponding pipe 114 with the first header pipe 140, and a closed position that hydraulically disconnects the corresponding pipe 114 with the first header pipe 140. Similarly, each of the floors or modules 122 of the lower section 120 (e.g. each of the pipes 124 of the floors 122) can connect to a second header pipe 150 via a valve 135 that is actuatable (e.g., by an electronic controller having one or more processors) between an open position that hydraulically connects the corresponding pipe 124 with the second header pipe 150, and a closed position that hydraulically disconnects the corresponding pipe 124 with the second header pipe 150. One or more turbine/pumps 180 are interposed between and connects to ends of the first header pipe 140 and the second header pipe 150. Additionally, and as disclosed below in FIGS. 10A-11H, the turbine pump 180 may be a separate turbine and a separate pump. The turbine pump 180 as a separate turbine and pump may include one or more pumps positioned below each floor of the floors 122 of the lower section 120.

The operation of the energy storage tower 100 will now be described with references to FIGS. 2-4. FIG. 2 shows the floors or modules 112 (e.g., all floors or modules 112) of the upper section 110 filled with a liquid (e.g., filled with water). For example, the pipes 114 of the floors 112 of the upper section 110 are filled with the liquid (e.g., filled with water); the pipes 114 in FIG. 2 are shaded dark to indicate they are filled with liquid. Additionally, the floors or modules 122 (e.g., all floors or modules 122) of the lower section 120 are empty (e.g., the pipes 124 of the floors 122 of the lower section 120 are empty); the pipes 124 in FIG. 2 are not shaded to indicate they are empty. The water in each of the floors 112 of the upper section 110 stores energy as potential energy. The valves 132 of the floors 112 in the upper section 110 are closed once the floors 112 (e.g., once the pipes 114 in the floors 112) are filled with liquid (e.g., water). Advantageously, by closing the valves 132, not only is the liquid (e.g., water) retained in its corresponding floor 112 (e.g., in the pipe 114 of the corresponding floor 112), but the liquid pressure on the walls of the corresponding floor 112 is limited to the single floor height (e.g., each floor 112 filled with liquid is not subjected to pressure from the floors above it that are filled with liquid). In the state illustrated in FIG. 2, the energy storage tower 100 is in a maximum energy storage state in that all the floors or modules 112 in the upper section 110 are filled and all the floors or modules 122 in the lower section 120 are empty.

With reference to FIGS. 2-3, to generate electricity the valve 132 of the last floor or module 112 (e.g., top most floor) in the upper section 110 is opened, the valve 135 in the last floor or module 122 of the lower section 120 is opened, and the water in said last floor 122 (e.g., the water in the pipe 114 of said floor) flows from the pipe 114 into the first header pipe 140, falls under force of gravity to the turbine pump 180, rotates the turbine pump 180 to generate electricity (via an electric motor/generator EM coupled to the turbine pump(s) 180), and continues to flow to the last floor 122 (e.g. top most floor) of the lower section 120 to fill said last floor 122, after which the corresponding valve 135 is closed (e.g., to retain the water in the last floor or module 122 of the lower section 120). FIG. 3 thus shows the last floor 112 in the upper section 110 empty (e.g., not shaded in the drawing to indicate it is empty) and the last floor 122 in the lower section 120 filled (e.g., shaded in the drawing to indicate it is filled).

With reference to FIGS. 3-4, to generate (additional) electricity the valve 132 of the next to last floor or module 112 in the upper section 110 is opened, the valve 135 in the next to last floor or module 122 of the lower section 120 is opened, and the water in said floor 122 (e.g., the water in the pipe 114 of said floor) flows from the pipe 114 into the first header pipe 140, falls under force of gravity to the turbine pump 180, rotates the turbine pump 180 to generate electricity (via the electric motor/generator EM coupled to the turbine pump(s) 180), and continues to flow to the next to last floor 122 of the lower section 120 to fill said next to last floor 122, after which the corresponding valve 135 is closed (e.g., to retain the water in the next to last floor 122 of the lower section 120). FIG. 4 thus shows the next to last floor 112 in the upper section 110 empty (e.g., not shaded in the drawing to indicate it is empty) and the next to last floor 122 in the lower section 120 filled (e.g., shaded in the drawing to indicate it is filled).

The process (e.g., a sequential process) described above can continue to generate electricity by transferring liquid (e.g., water) from each floor or module 112 (e.g., from each pipe 114 in each floor 112) in the upper section 110 to a corresponding floor or module 122 (e.g., to a pipe 124 of a corresponding floor 122) in the lower section 120, for example, until all the floors or modules 112 in the upper section 110 are empty and all the floors or modules 122 in the lower section 120 are filled. Advantageously, the liquid is moved between floors 112 in the upper section and corresponding floors 122 in the lower section 120 so that the turbine pump(s) 180 (or individual pumps and turbines) operate with the same pressure differential, which can increase the efficiency of operation. In some examples, the liquid can be moved from any floor 112 of the upper section 110 to any floor 122 (e.g., a non-corresponding floor) of the lower section 120. Advantageously, moving liquid from non-corresponding floors 112, 122 of the upper section 110 and lower section 120 may generate desired amounts of energy during operation (e.g., by having liquid flow a desired distance corresponding to a potential or kinetic energy amount). Additionally, the process of generating energy (e.g., electricity) can be simultaneous such that liquid can be moved from all of the floors 112 (e.g., from pipes 114) in the upper section 110 to all of the floors 122 (e.g., to pipes 124) in the lower section 120 at once so that each floor 122 in the lower section 120 is filled at essentially the same time. All of the liquid flowing from the upper section 110 can fall under the force of gravity to the turbine pump 180 (or turbine) and rotate the turbine pump 180 (or turbine) to generate electricity (e.g., via the electric motor/generator EM).

The process of storing energy is the same as described above but in reverse. For example, starting from a scenario where all the floors 122 (e.g., the pipes 124 in all the floors 122) of the lower section 120 are filled with liquid (e.g., with water) and all the floors 112 (e.g., the pipes 114 in all the floors 112) of the upper section 110 are empty, the valve 135 corresponding to a first (e.g., bottom most) floor 122 of the lower section 120 is opened, the valve 132 corresponding to a first (e.g., bottom most) floor 112 of the upper section 110 is opened, and the liquid in the first floor 122 is pumped (by one or more pumps or the turbine pump 180) to the first floor 112 to fill it with liquid, after which the valve 132 is closed to retain the liquid in the first floor 112 (e.g., retain the liquid in the pipe 114 of the first floor 112) of the upper section 110. Then, the valve 135 corresponding to a second (e.g., second from bottom) floor 122 of the lower section 120 is opened, the valve 132 corresponding to a second (e.g., second from bottom) floor 112 of the upper section 110 is opened, and the liquid in the second floor 122 is pumped (by one or more pumps or the turbine pump 180) to the second floor 112 to fill it with liquid, after which the valve 132 is closed to retain the liquid in the second floor 112 (e.g., retain the liquid in the pipe 114 of the second floor 112) of the upper section 110. The process (e.g., a sequential process) can be continued to move liquid (e.g., water) from floors 122 (e.g., from pipes 124 in floors 122) in the lower section 120 to floors 112 (e.g., to pipes 114 in floors 112) in the upper section 110, for example, until all the floors 112 in the upper section 110 are filled with liquid (e.g., the pipes 114 of the floors 112 are filled with liquid) and all the floors 122 in the lower section 120 are empty (e.g., the pipes 124 of the floors 122 are empty). Additionally, the process of storing energy can be simultaneous such that liquid can be moved from all of the floors 122 (e.g., from pipes 124) in the lower section 120 to all of the floors 112 (e.g., to pipes 114) in the upper section 110 at once so that each floor 112 is filled at essentially the same time.

Figure 7:
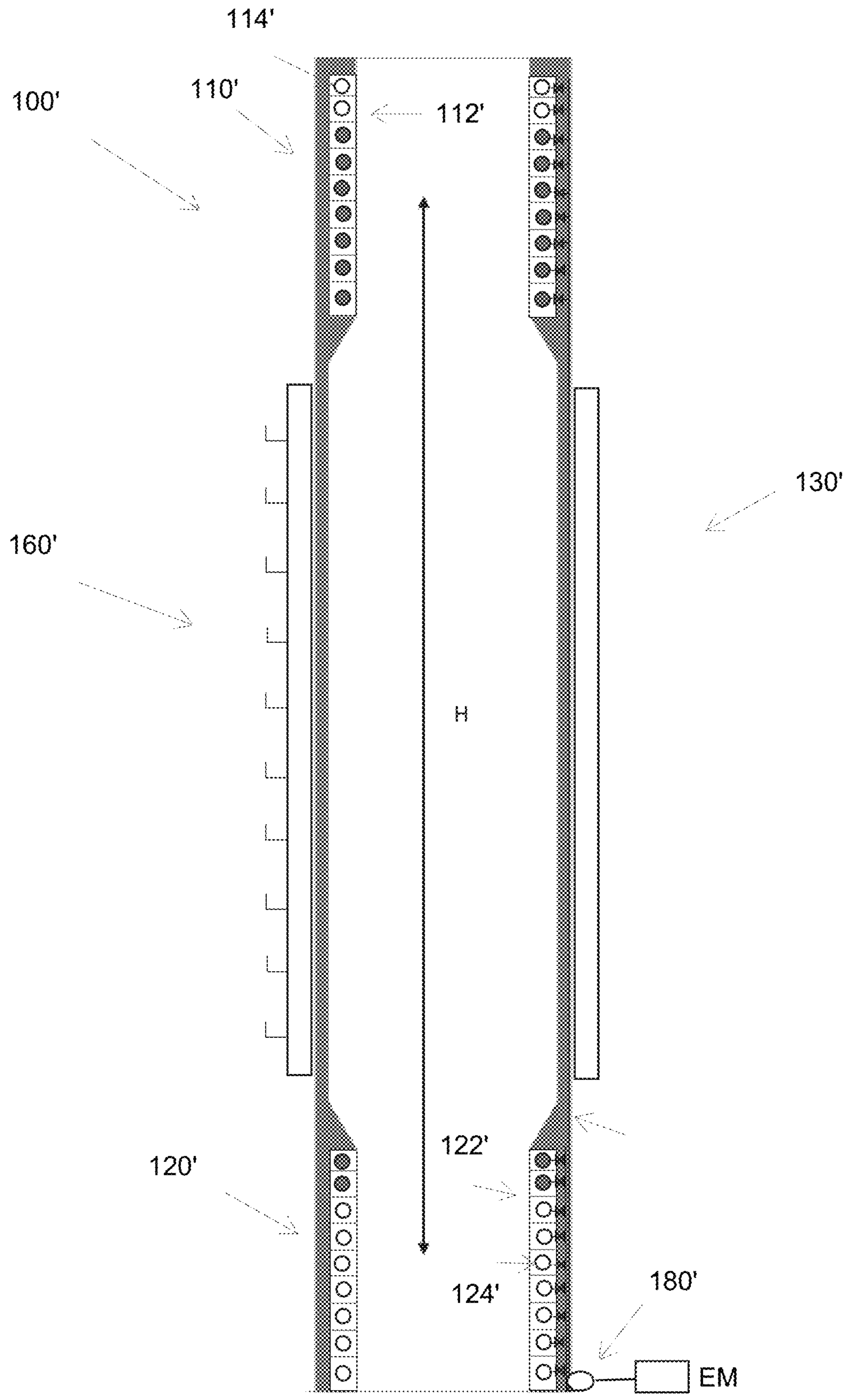
FIG. 7 is a schematic cross-sectional view of an energy storage tower.

FIG. 7 shows an energy storage tower 100'. Some of the features of the energy storage tower 100' are similar to the features of the energy storage tower 100 in FIGS. 1-5B. Thus, reference numerals used to designate the various components of the energy storage tower 100' are identical to those used for identifying the corresponding components of the energy storage tower 100 in FIGS. 1-5B, except that an "'" has been added to the end of the numerical identifier. Therefore, the structure and description for the various features of the energy storage tower 100 and how it's operated and controlled in FIGS. 1-5B are understood to also apply to the corresponding features of the energy storage tower 100' (e.g., a single tower, hereafter the "tower") in FIG. 7, except as described below. For example, the tower 100' may include the upper section 110', the lower section 120', the intermediate section 130', the floors 112', 122', the pipe 114', 124', and the turbine pump 180' (or separate turbine and pump).

The tower 100' differs from the tower 100 in that it optionally includes a further structure 160' that extends circumferentially about (e.g., extends about an entire circumference of) the tower 100'. The structure 160' can include (e.g., house) residential or commercial space (e.g., offices, restaurants, retail stores, computer datacenters), the tower 100' thereby advantageously functioning as a mixed used space. For example, the structure 160' can include residences with balconies. Although not shown, the structure 160' can extend within (e.g., circumferentially around and radially within) the tower 100'.

Figure 8:
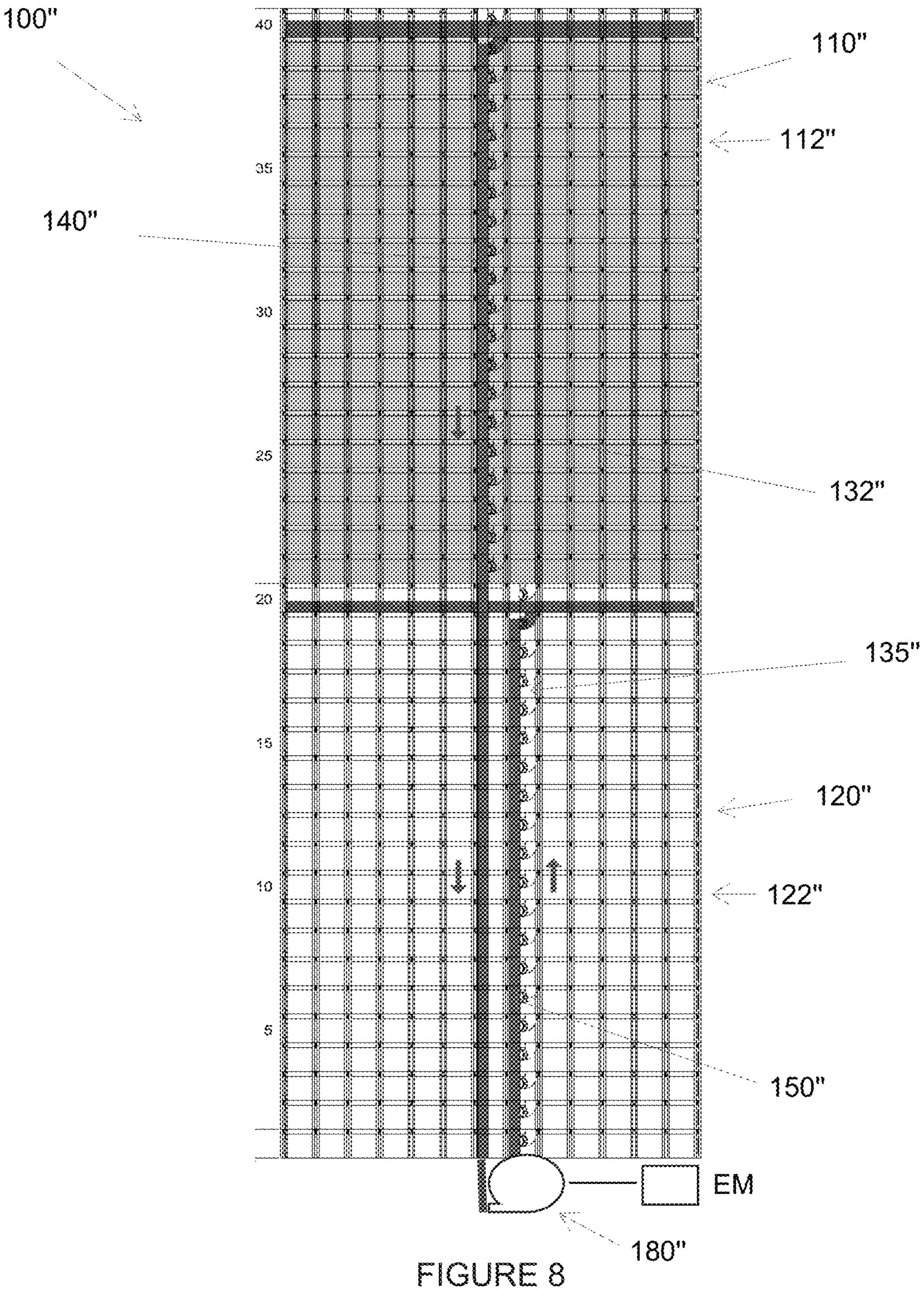
FIG. 8 is a schematic side view of an energy storage tower.

FIG. 8 shows an energy storage tower 100". Some of the features of the energy storage tower 100" are similar to the features of the energy storage tower 100 in FIGS. 1-6. Thus, reference numerals used to designate the various components of the energy storage tower 100" are identical to those used for identifying the corresponding components of the energy storage tower 100 in FIGS. 1-6, except that an """ has been added to the end of the numerical identifier. Therefore, the structure and description for the various features of the energy storage tower 100 and how it's operated and controlled in FIGS. 1-5B are understood to also apply to the corresponding features of the energy storage tower 100" (e.g., a single tower, hereafter the "tower") in FIG. 8, except as described below.

The tower 100" differs from the tower 100 in that the tower 100" does not have a hollow cylindrical shape but instead has a typical building structure that extends in three dimensions (height, width and depth). Additionally, there is no intermediate section; instead, the lower section 120" is immediately below the upper section 110". Also each of the floors 112" in the upper section 110" and the floors 122" in the lower section 120" can be filled (e.g., completely filled) with liquid (e.g., water). For example, the floors 112", 122" do not have pipes or liners that hold the liquid within the floors 112", 122". In the illustrated example, the tower 100" has forty floors, with the upper section 110" having twenty floors and the lower section 120" having twenty floors. In the illustrated example, all the floors 112" in the upper section 110" are filled with liquid (e.g., filled with water) and all of the floors 122" in the lower section 120" are empty. All of the floors 112" in the upper section 110" and all of the floors 122" in the lower section 120" may be free of (e.g., does not include) an internal channel or oculus (e.g., along a height of the tower 100"). In this example, the tower 100" is fully charged.

With continue reference to FIG. 8, to generate electricity the valve 132" of floor 40 (e.g., the last floor 112") in the upper section 110" is opened, the valve 135" of floor 20 (e.g., the last floor 122") of the lower section 120" is opened, and the water in floor 40 flows into the first header pipe 140", falls under force of gravity to one or more turbines or the turbine pump 180", rotates the one or more turbines or turbine pump 180" to generate electricity, and continues to flow to floor 20 of the lower section 120" to fill it, after which the corresponding valve 135" is closed (e.g., to retain the water in floor 20 of the lower section 120"). Then, to continue generating electricity, the valve 132" of floor 39 (e.g., the next to last floor 112") in the upper section 110" is opened, the valve 135" of floor 19 (e.g., the next to last floor 122") of the lower section 120" is opened, and the water in floor 39 flows into the first header pipe 140", falls under force of gravity to the one or more turbines or turbine pump 180", rotates the turbine pump 180" to generate electricity, and continues to flow to floor 19 of the lower section 120" to fill it, after which the corresponding valve 135" is closed (e.g., to retain the water in floor 20 of the lower section 120"). This process can be continued to move water from the floors 112" in the upper section 110" to corresponding floors 122" in the lower section 120" until all the floors 112" of the upper section 110" are empty and all the floors 122" of the lower section 120" are filled with water.

The process of storing energy is the same as described above but in reverse (e.g., pumping water with one or more pumps or the turbine/pump 180" from floors 122" in the lower section 120" to floors 112" in the upper section 110"). For example, starting from a scenario where all the floors 122" are filled with water and all the floors 112" are empty, the valve 132" of floor 21 (e.g., the first floor 112") in the upper section 110" is opened, the valve 135" of floor 1 (e.g., the first floor 122") of the lower section 120" is opened, and the water in floor 1 is pumped by the one or more pumps or turbine/pump 180" from floor 1, through the second header pipe 150" to floor 21 of the upper section 110" to fill it, after which the corresponding valve 132" is closed (e.g., to retain the water in floor 21 of the upper section 110"). Then, to continue storing energy, the valve 132" of floor 22 (e.g., the second floor 112") in the upper section 110" is opened, the valve 135" of floor 2 (e.g., the second floor 122") of the lower section 120" is opened, and the water in floor 2 is pumped by the one or more pumps or turbine-pump 180" from floor 2, through the second header pipe 150" to floor 22 of the upper section 110" to fill it, after which the corresponding valve 132" is closed (e.g., to retain the water in floor 22 of the upper section 110"). This process can be continued to move water from the floors 122" in the lower section 120" to corresponding floors 112" in the upper section 110" until all the floors 122" of the lower section 120" are empty and all the floors 112" of the upper section 110" are filled with water.

Figure 9:
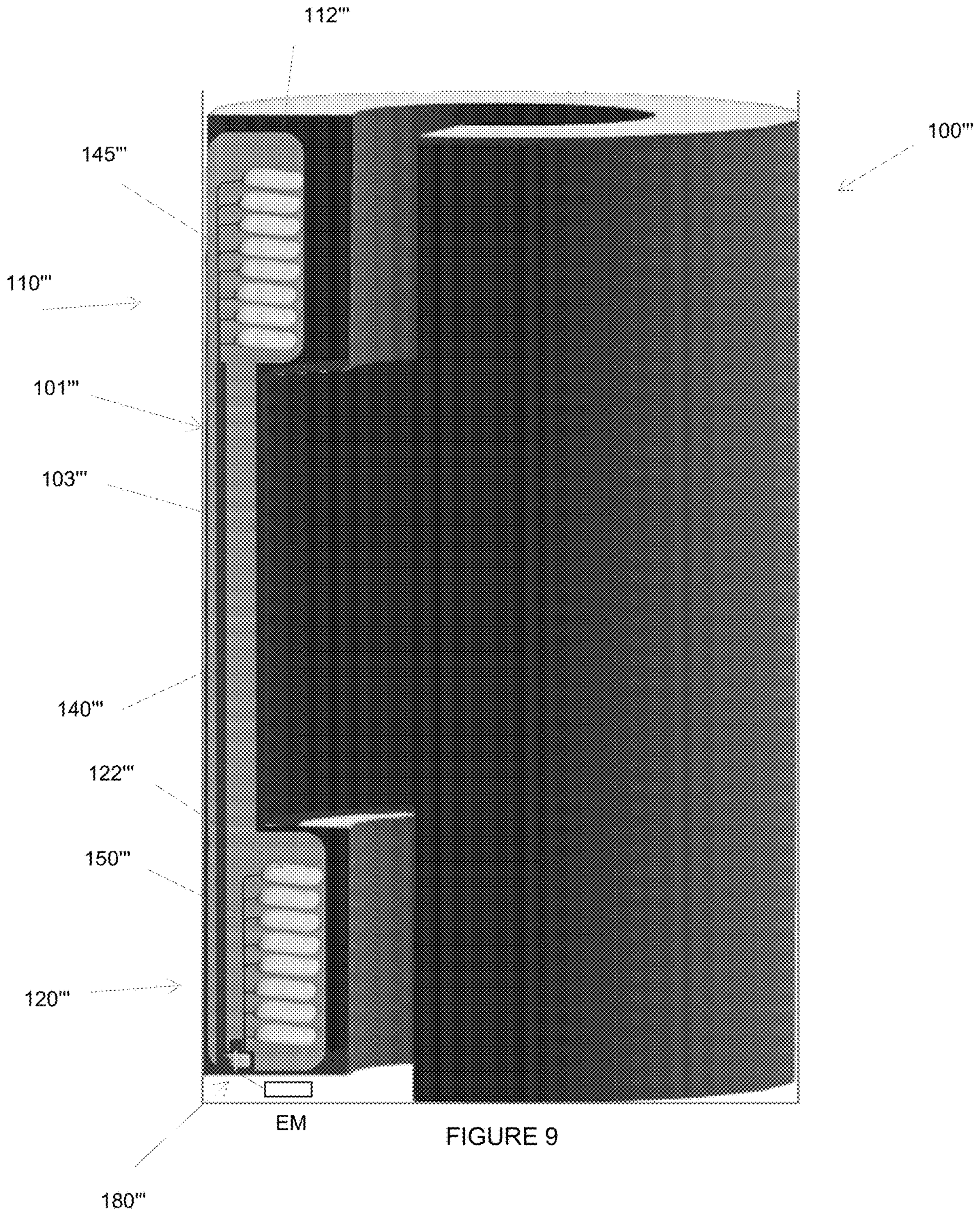
FIG. 9 is a schematic partial cross-sectional view of an energy storage tower.

FIG. 9 shows an energy storage tower 100'". Some of the features of the energy storage tower 100'" are similar to the features of the energy storage tower 100 in FIGS. 1-6, the tower 100' in FIG. 7, and the tower 100" in FIG. 8. Thus, reference numerals used to designate the various components of the energy storage tower 100'" are identical to those used for identifying the corresponding components of the energy storage tower 100 in FIGS. 1-6, except that an "'"" has been added to the end of the numerical identifier. Therefore, the structure and description for the various features of the energy storage tower 100 in FIGS. 1-6, the tower 100' in FIG. 7, and the tower 100" in FIG. 8 are understood to also apply to the corresponding features of the energy storage tower 100'" (e.g., a single tower, hereafter the "tower") in FIG. 9, except as described below.

FIG. 9 shows the tower 100'" having an upper section 110'" and a lower section 120" vertically below the upper section 110". The upper section 110'" can have a plurality of floors or modules 112"", and the lower section 120'" can have a plurality of floors or modules 122"" (e.g., the lower section 120'" can have the same or a similar number of floors or modules as the upper section 110'"). Each of the floors or modules 112'", 122'" can extend radially relative to the outer wall 101'" of the tower 100'". For example, the floors or modules 112'", 122"" can extend circumferentially around the tower 100'" (e.g., about a central axis of the tower 100'") between the outer wall 101'" and the inner wall 103'". Additionally, each of the floors or modules 112'" in the upper section 110'" can be individually coupled to a pipe 145'". The each of the pipes 145'" can be hydraulically coupled to a header pipe 140'". As a liquid flows out of the floors or modules 112'", the liquid will flow out of an individual floor or module of the floors or modules 112"", into a pipe of the pipes 145'" and to the header pipe 140'". Each of the floors or modules 122"" at the lower section 120'" can be coupled to pipes 150'". One or more turbines 180'" are interposed between and connect to an end of the header pipe 140'" and an end of the pipes 150'". The header pipe 140'" can extend between the outer wall 101'" and the inner wall 103'". The pipes 145'", 150'" can be hydraulically connected or disconnected to the header pipe 145'" with one or more actuatable valves (e.g., actuatable by an electronic controller having one or more processors).

FIGS. 10A-10K show features of an energy storage tower 200 (e.g., a single tower, hereafter the "tower"). Some of the features of the tower 200 are similar to the features of the tower 100 in FIGS. 1-6, the tower 100' of FIG. 7, the tower 100" of FIG. 8, and the tower 100"" of FIG. 9. Thus, reference numerals used to designate the various components of the tower 200 are identical to those used for identifying the corresponding components of the tower 100 in FIGS. 1-6, the tower 100' of FIG. 7, the tower 100" of FIG. 8, and the tower 100"" of FIG. 9, except that a "2" has replaced a "1" at the beginning of the numerical identifier. Therefore, the structure and description for the various features of the towers 100, 100', 100", and 100" and how they are operated and controlled are understood to also apply to the corresponding features of the tower 200, except as described below.

Figure 10A:
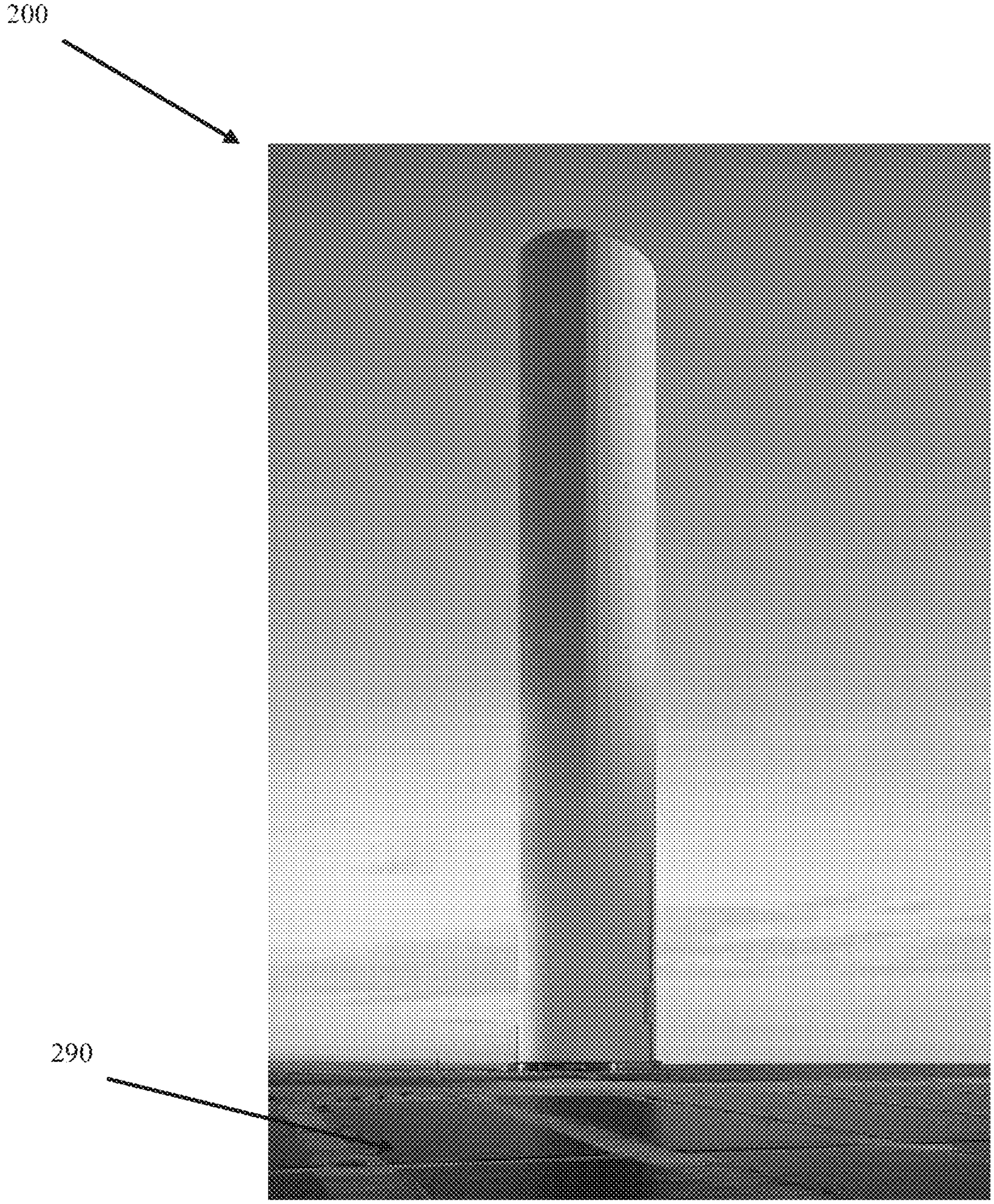
FIG. 10A is a schematic side view of an energy storage tower.
Figure 10B:
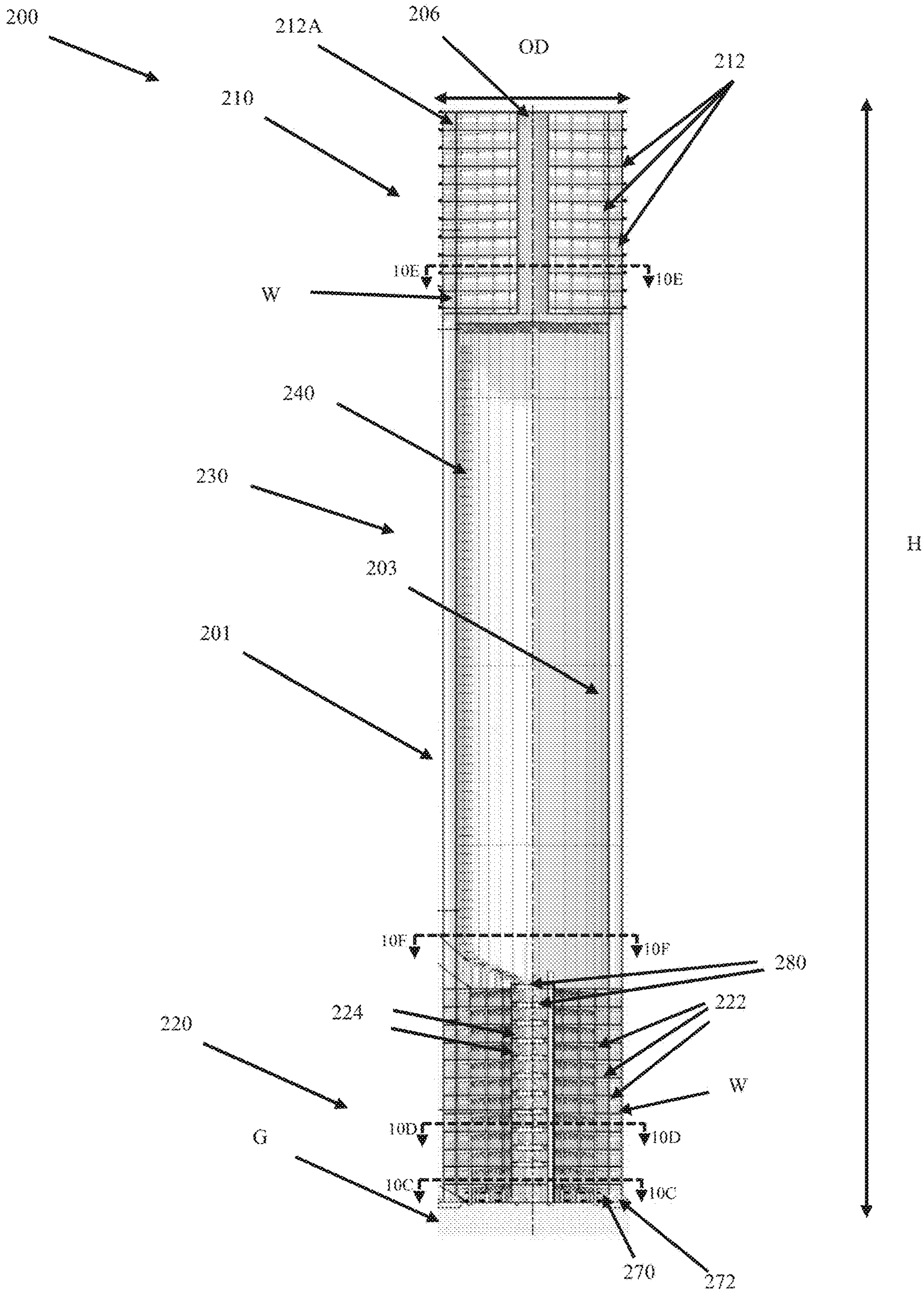
FIG. 10B is a schematic cross-sectional view of the tower along the height of the energy storage tower.
Figure 10C:
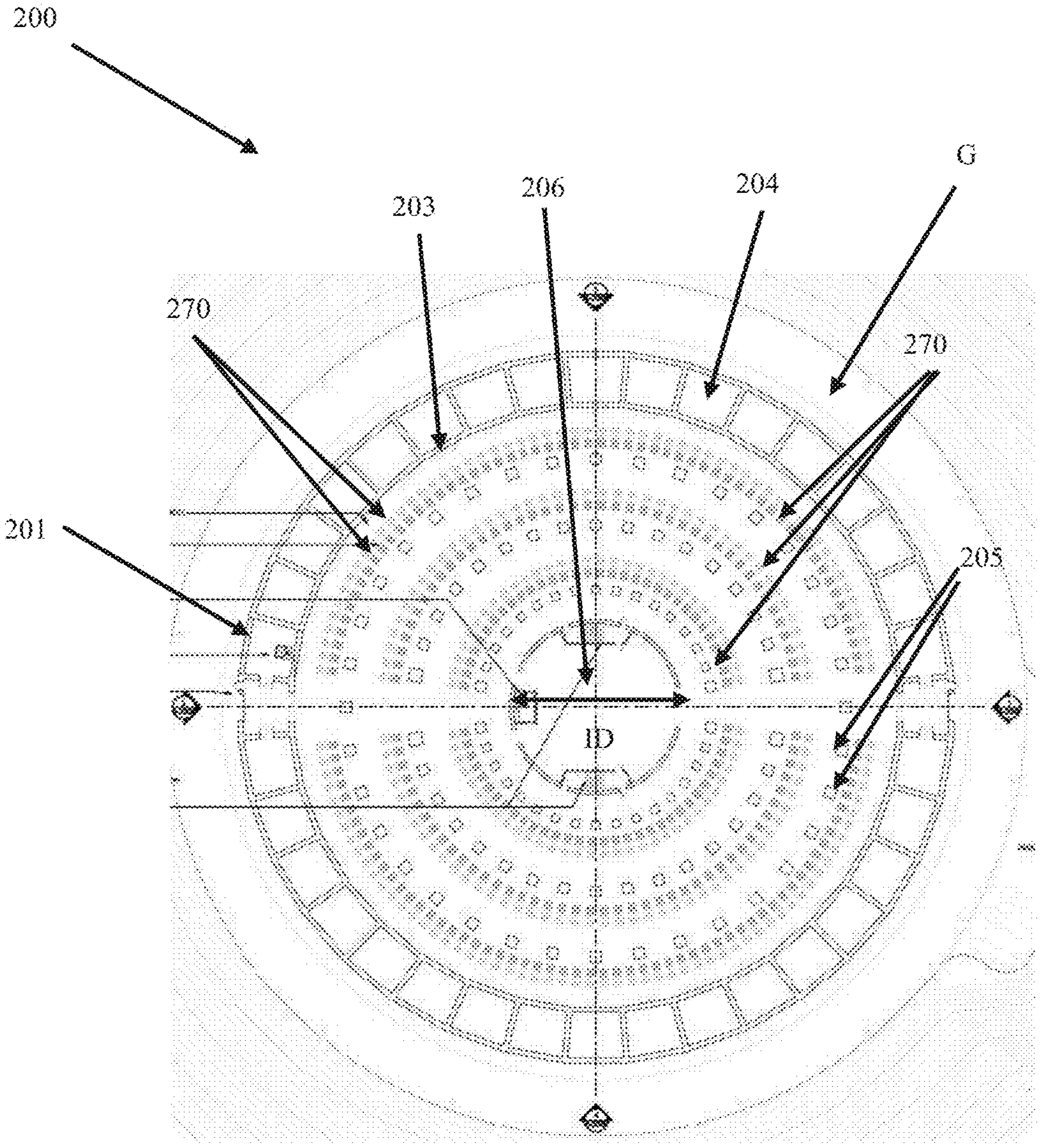
FIG. 10C is a schematic top cross-sectional view of a lower section of the energy storage tower, viewed along line 10C-10C in FIG. 10B.
Figure 10D:
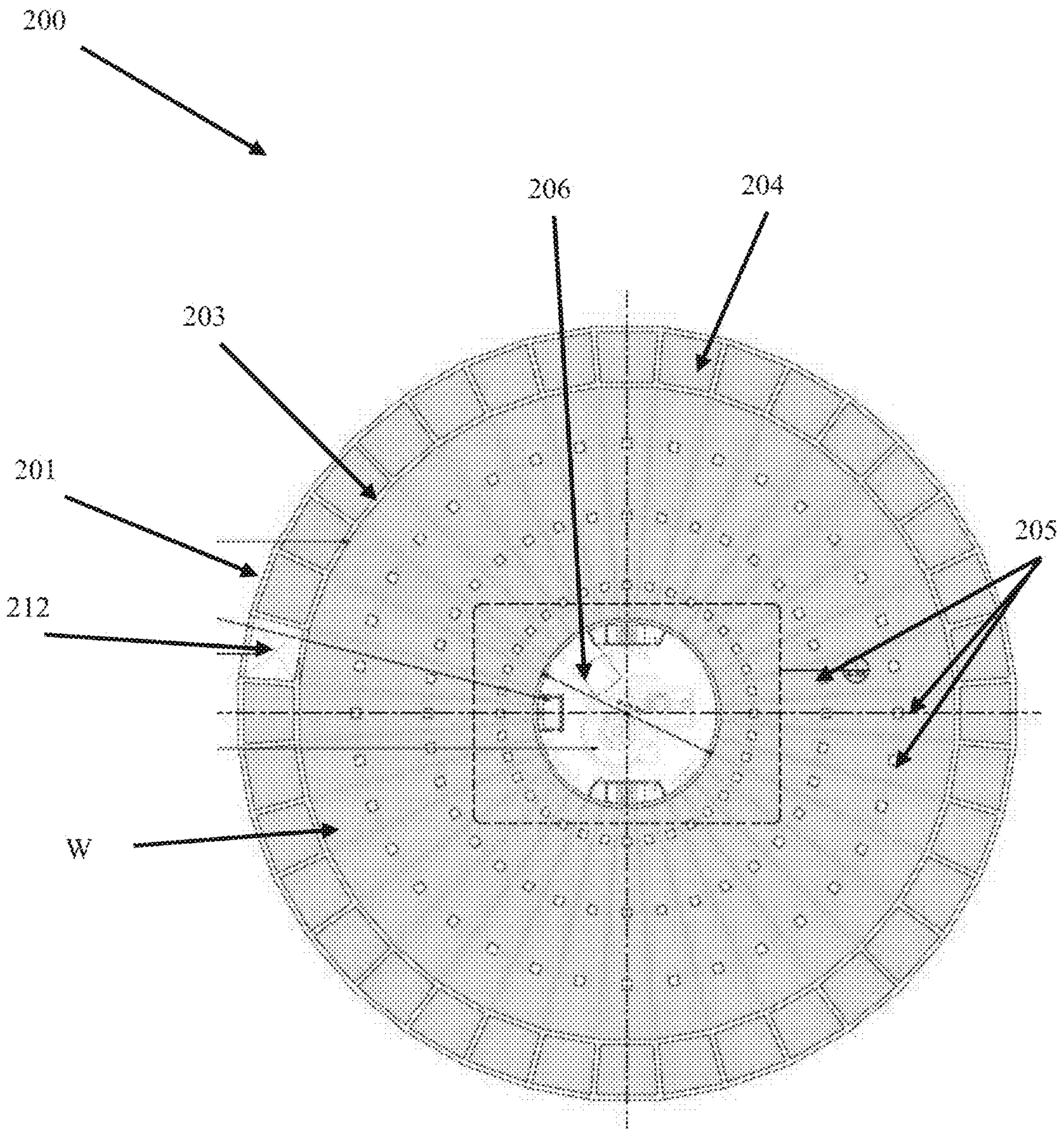
FIG. 10D is a schematic top cross-sectional view of the energy storage tower, viewed along line 10D-10D in FIG. 10B.
Figure 10E:
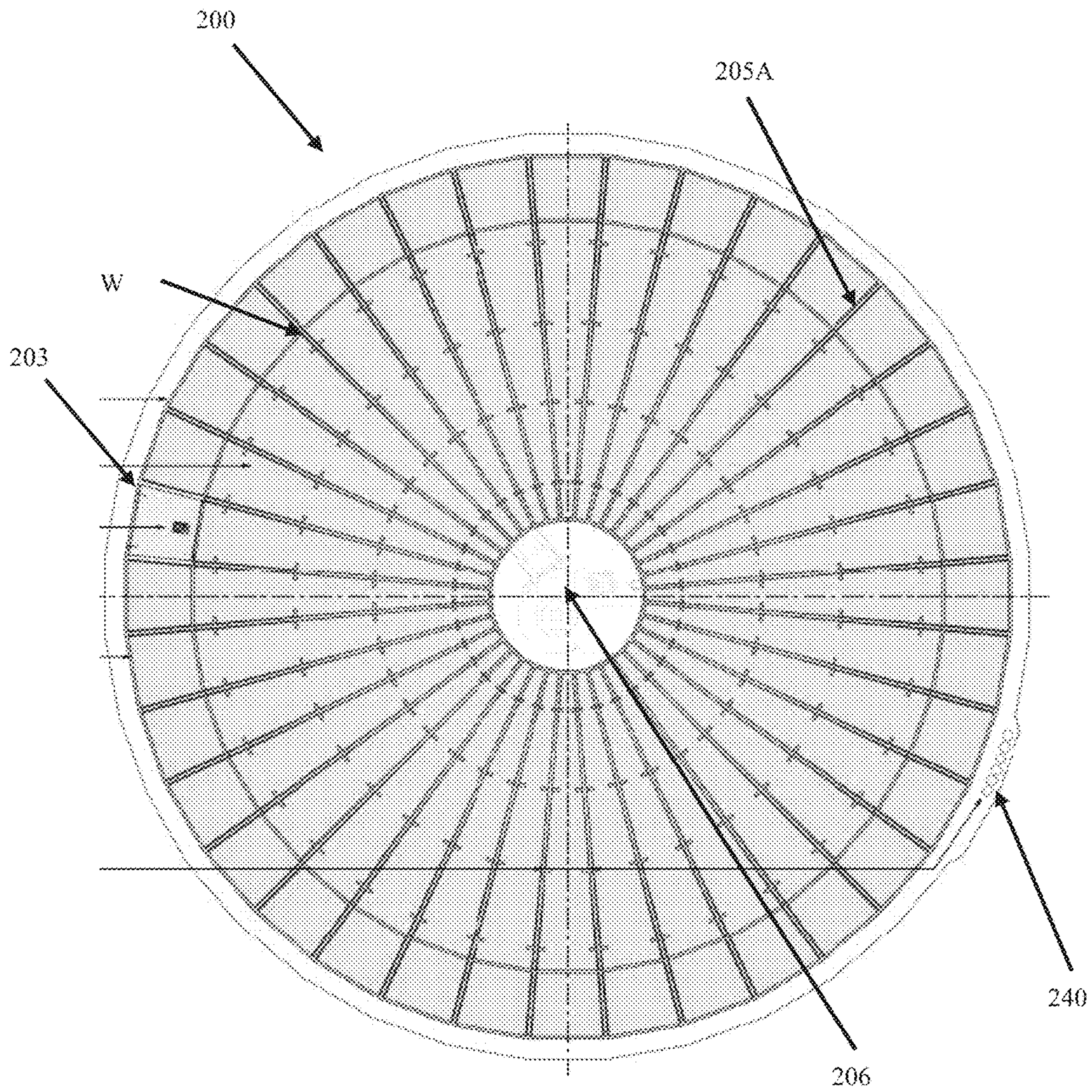
FIG. 10E is a schematic top cross-sectional view of the energy storage tower, viewed along line 10E-10E in FIG. 10B.
Figure 10F:
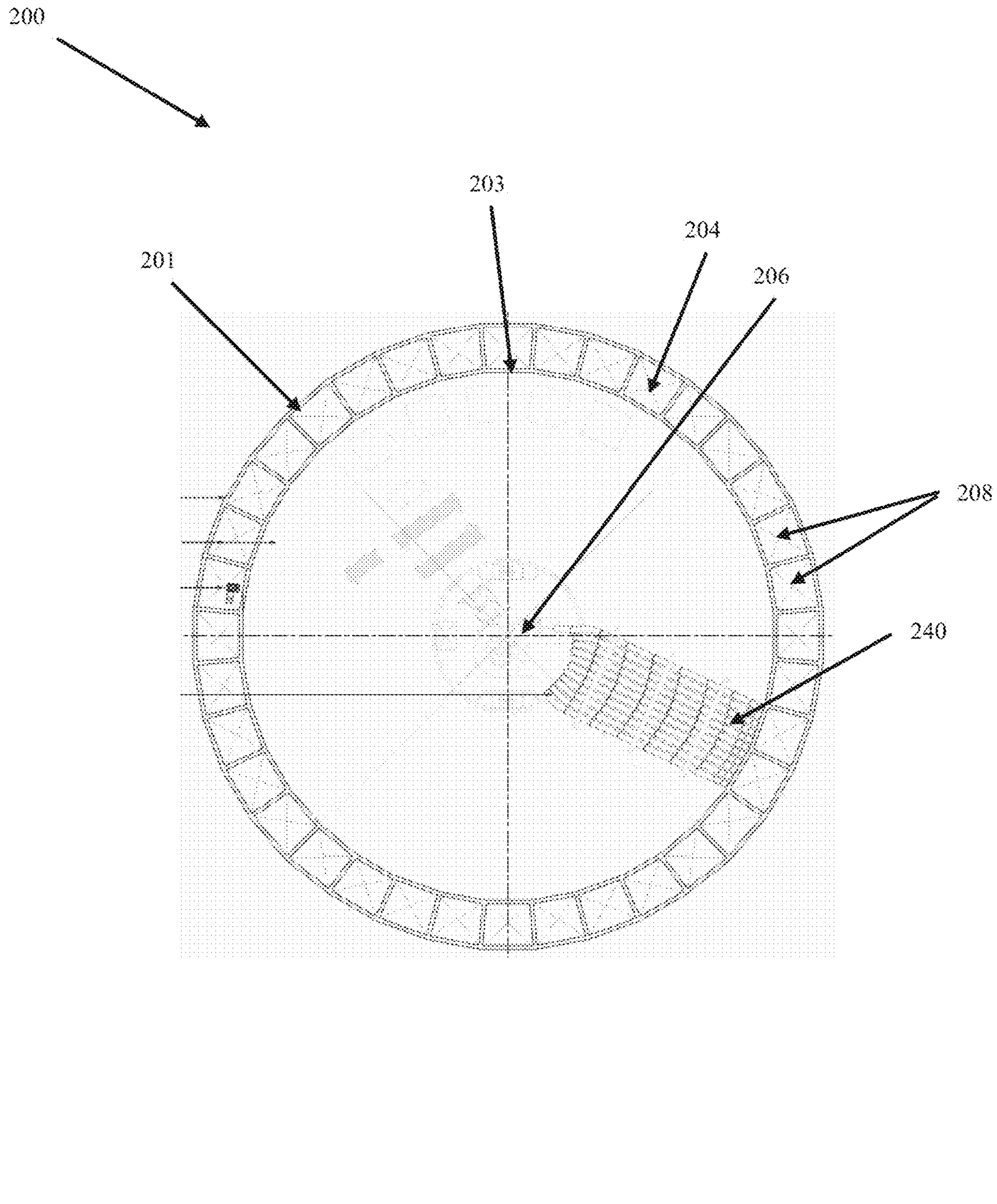
FIG. 10F is a schematic top cross-sectional view of a middle section of the energy storage tower, viewed along line 10F-10F in FIG. 10B.
Figure 10G:
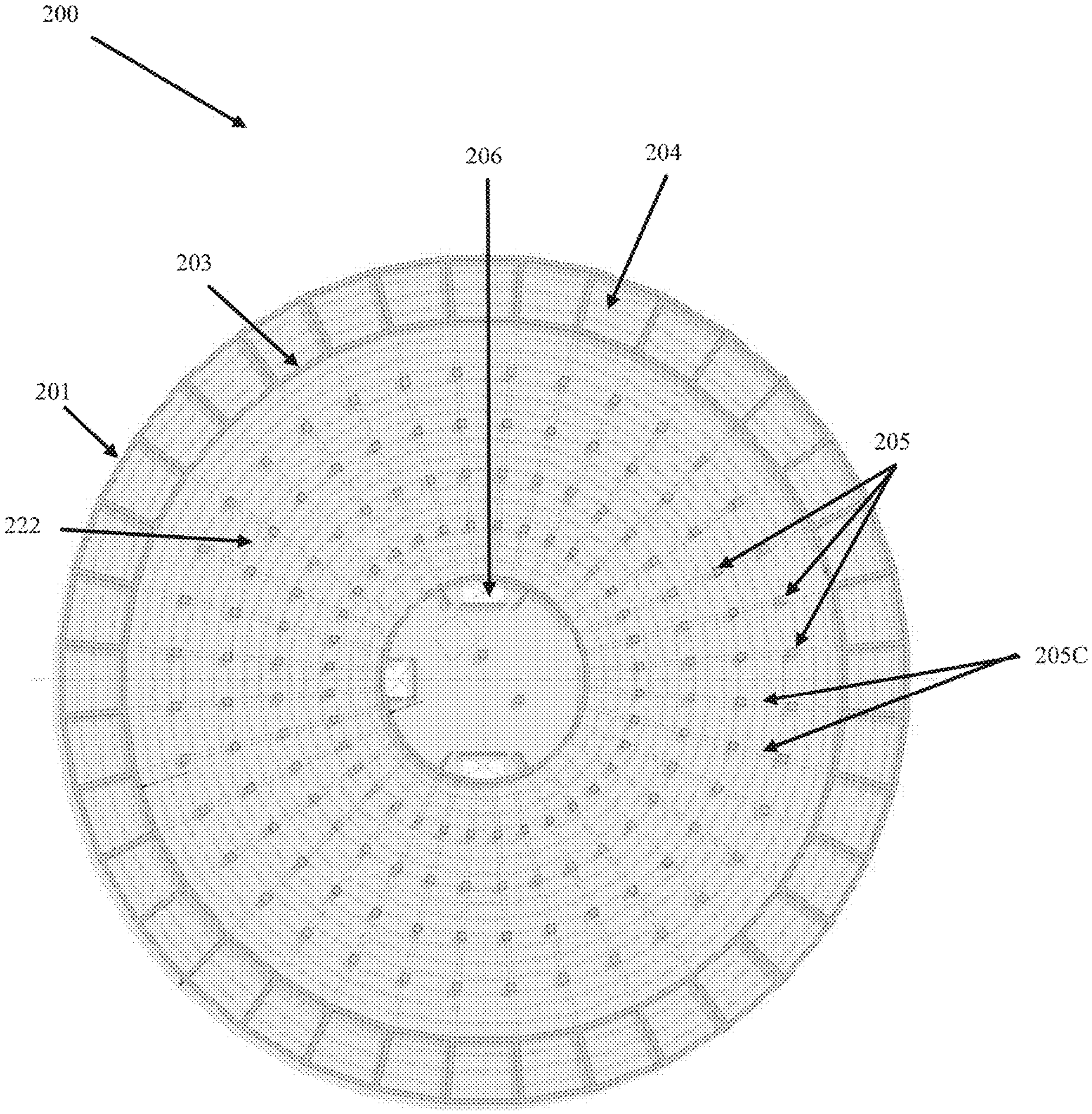
FIG. 10G is another schematic top cross-sectional view of the energy storage tower as shown in FIG. 10D.
Figure 10H:
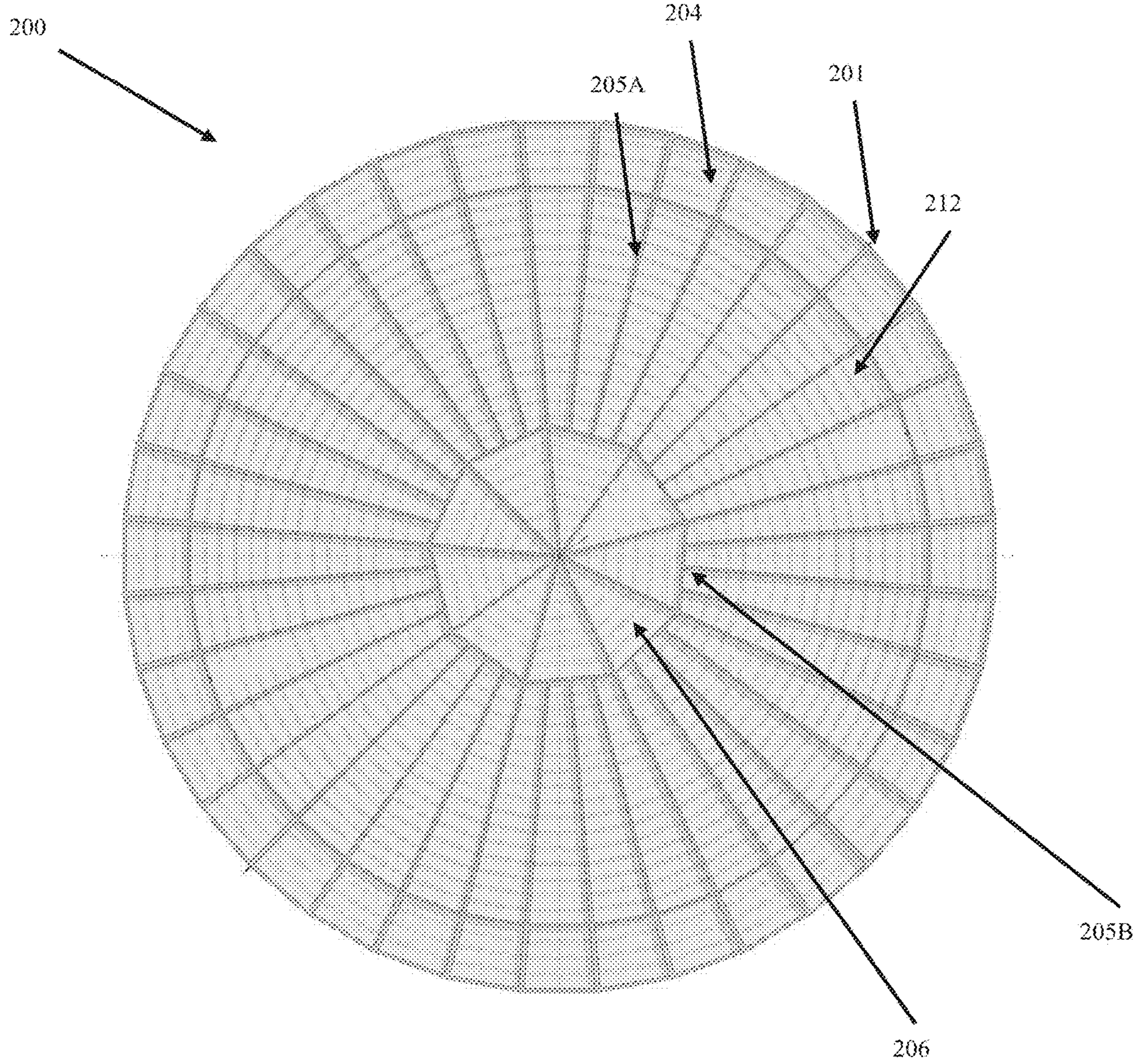
FIG. 10H is another schematic top cross-sectional view of the energy storage tower as shown in FIG. 10E.
Figure 10I:
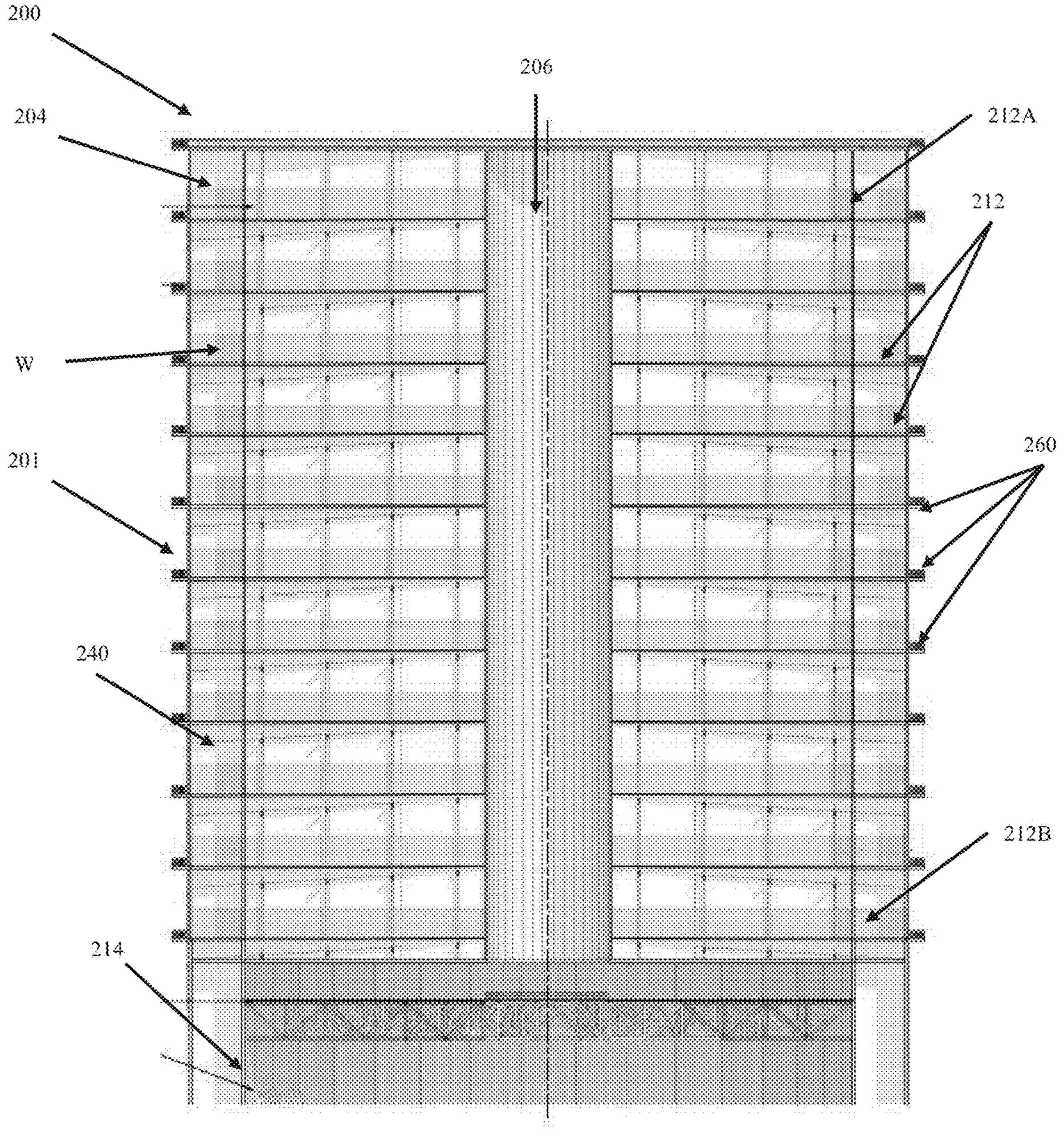
FIG. 10I is a schematic enlarged cross sectional view of an upper section of the energy storage tower.
Figure 10J:
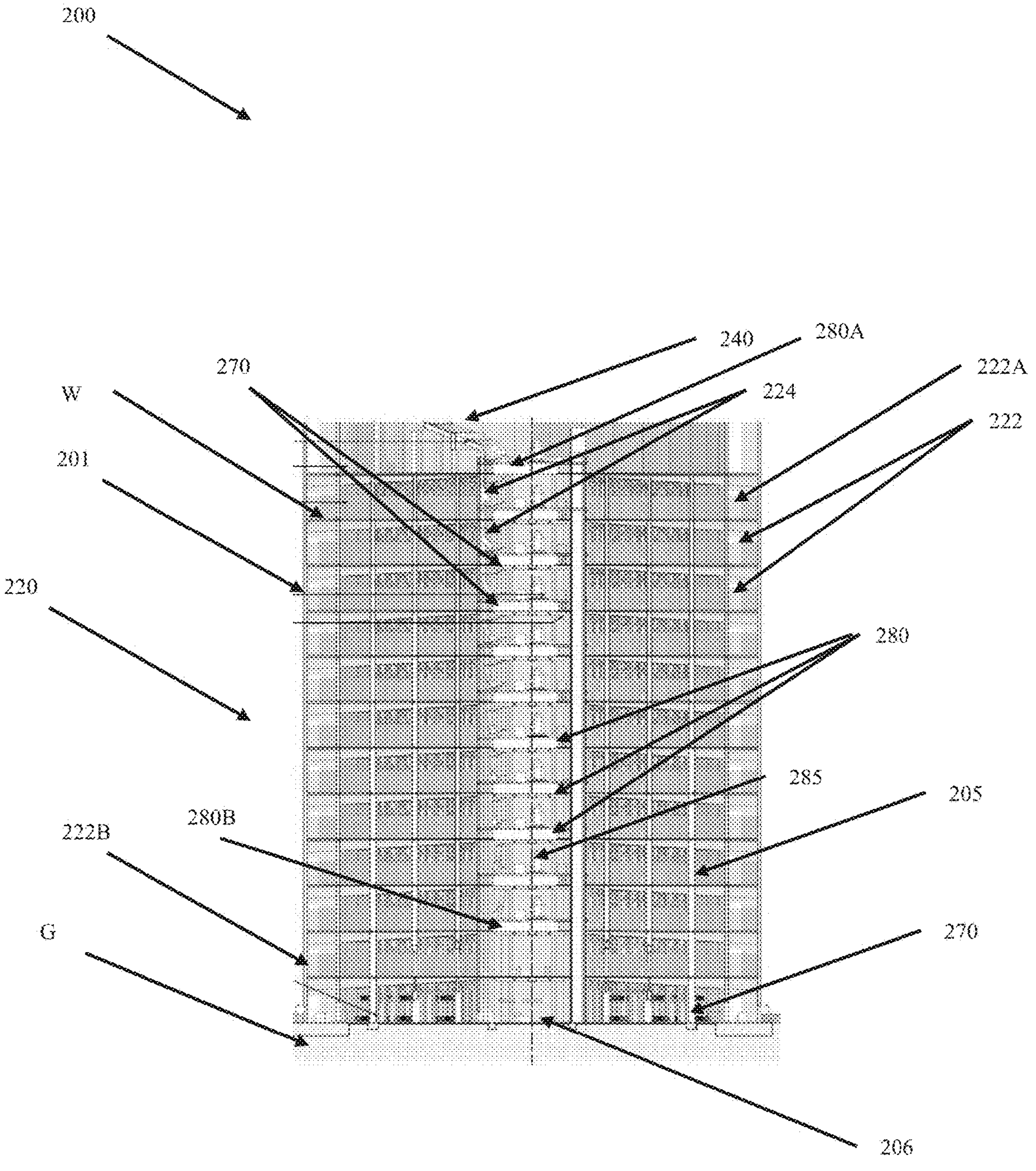
FIG. 10J is a schematic enlarged cross sectional view of a lower section of the energy storage tower.
Figure 10K:
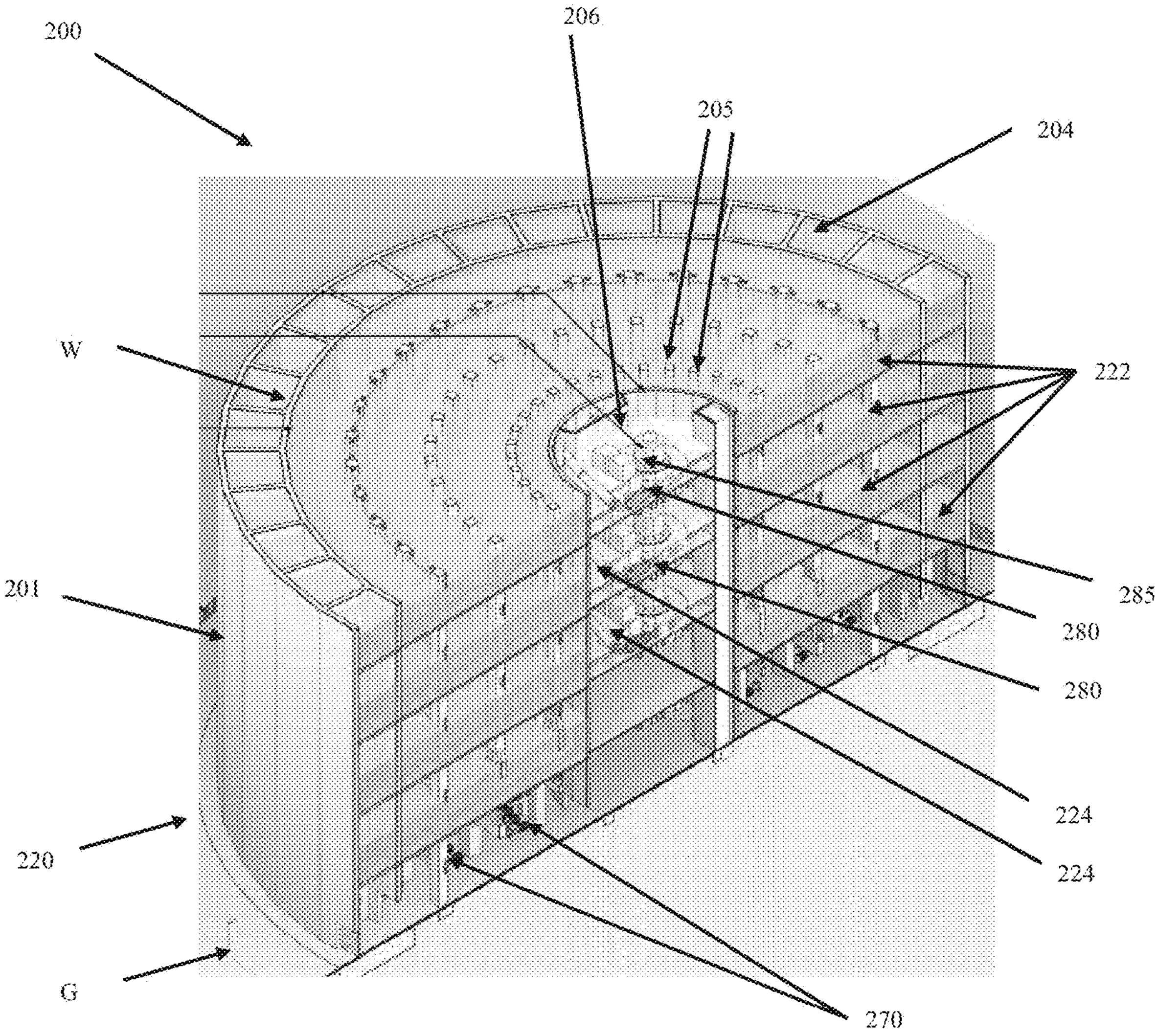
FIG. 10K is a schematic isometric cross-sectional view of a lower section of the energy storage tower.
Figure 11A:
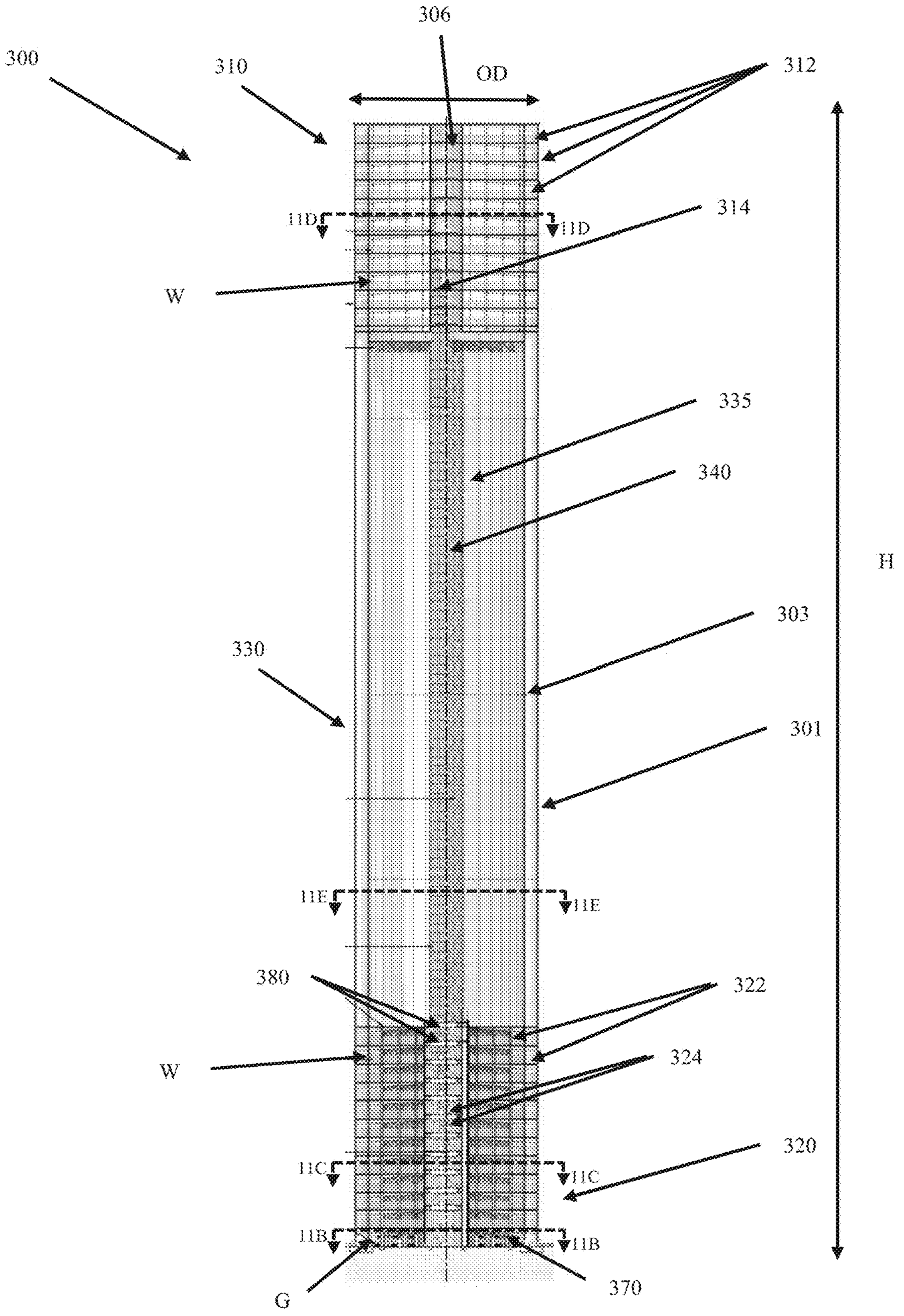
FIG. 11A is a schematic cross-sectional view of the tower along the height of the energy storage tower.
Figure 11B:
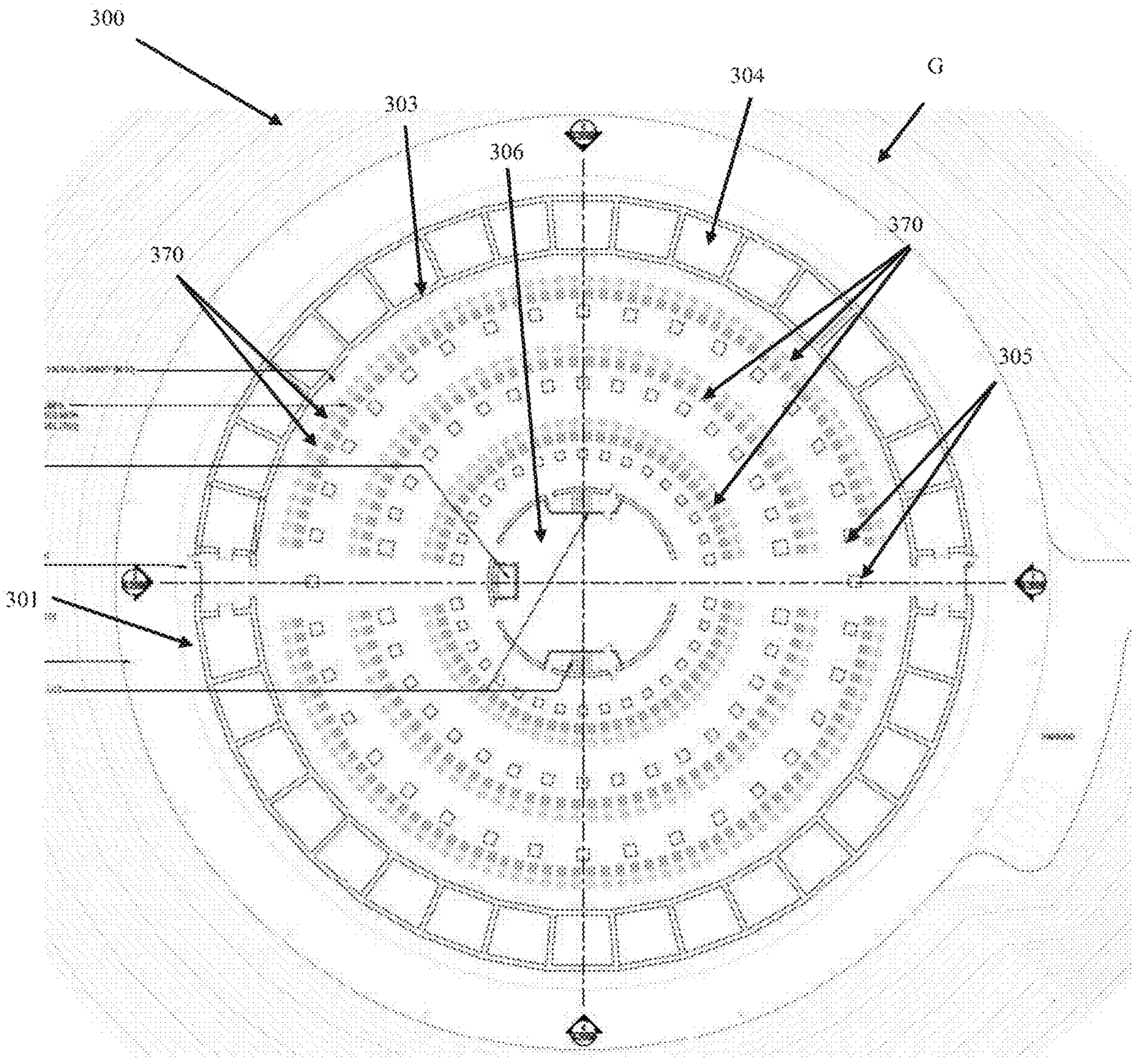
FIG. 11B is a schematic top cross-sectional view of a lower section of the energy storage tower, viewed along line 11B-11B in FIG. 11A.
Figure 11C:
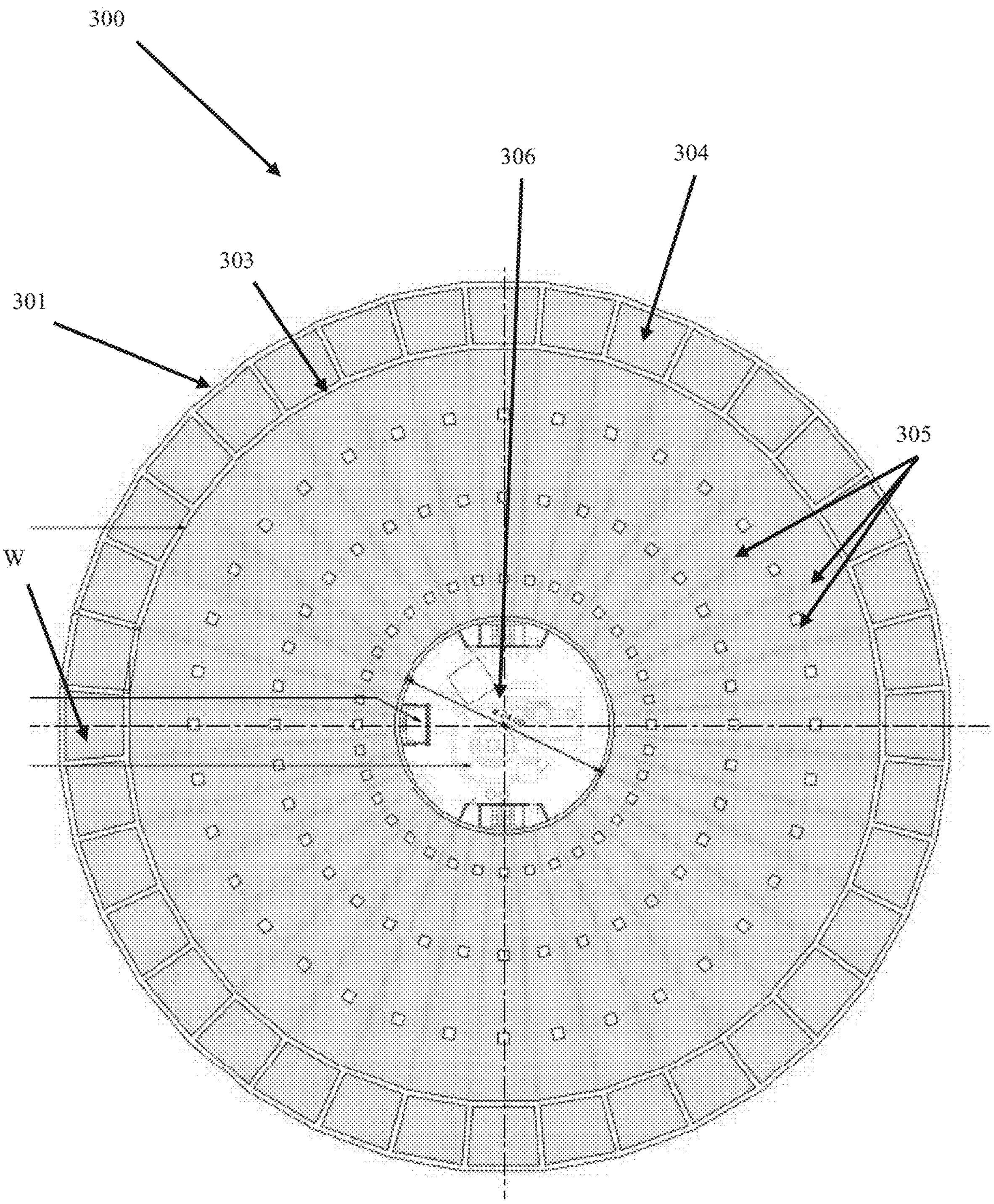
FIG. 11C is a schematic top cross-sectional view of the energy storage tower, viewed along line 11C-11C in FIG. 11A.
Figure 11D:
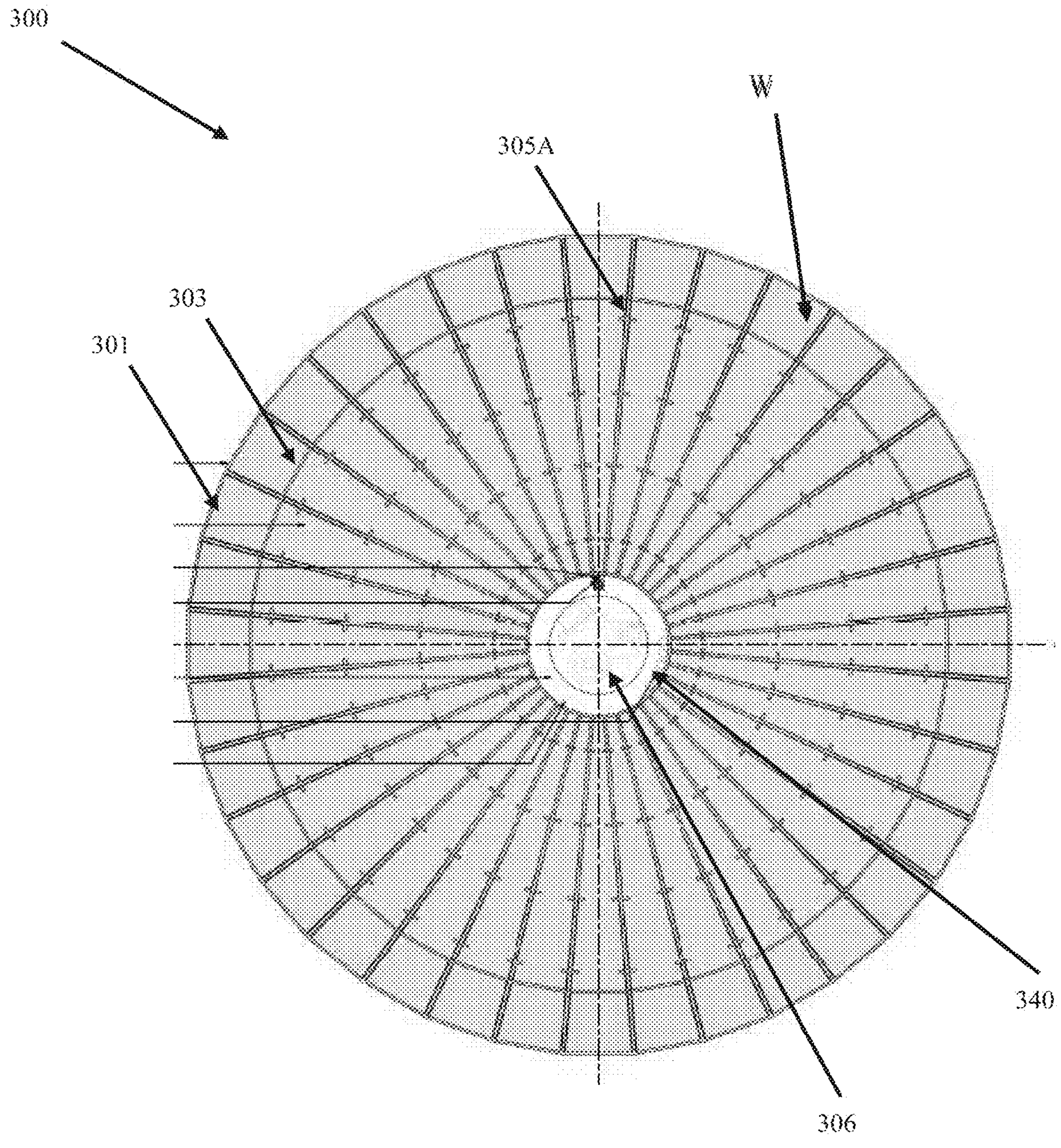
FIG. 11D is a schematic top cross-sectional view of the energy storage tower, viewed along line 11D-11D in FIG. 11A.
Figure 11E:
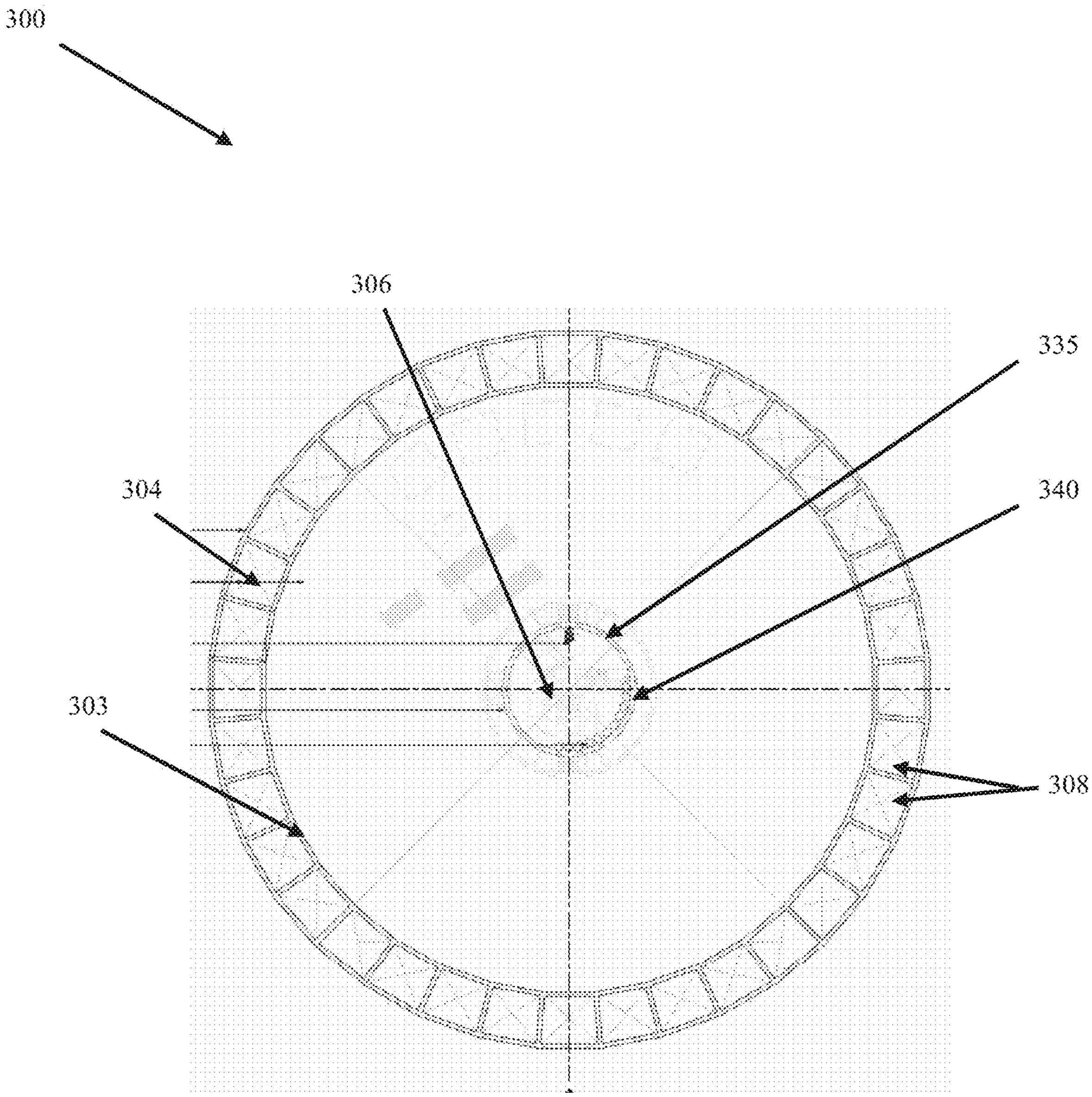
FIG. 11E is a schematic top cross-sectional view of a middle section of the energy storage tower, viewed along line 11E-11E in FIG. 11A.
Figure 11F:
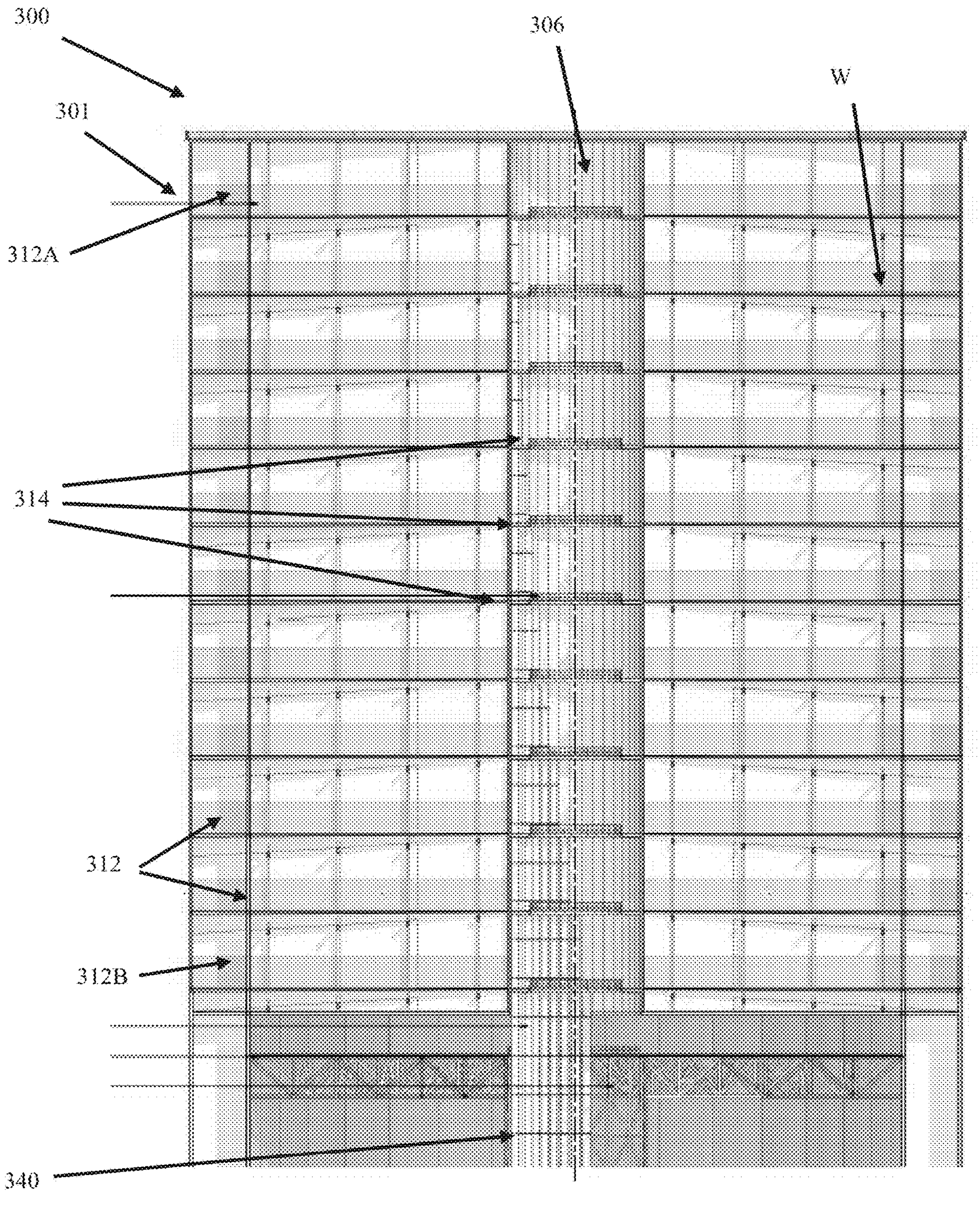
FIG. 11F is a schematic enlarged cross sectional view of an upper section of the energy storage tower.
Figure 11G:
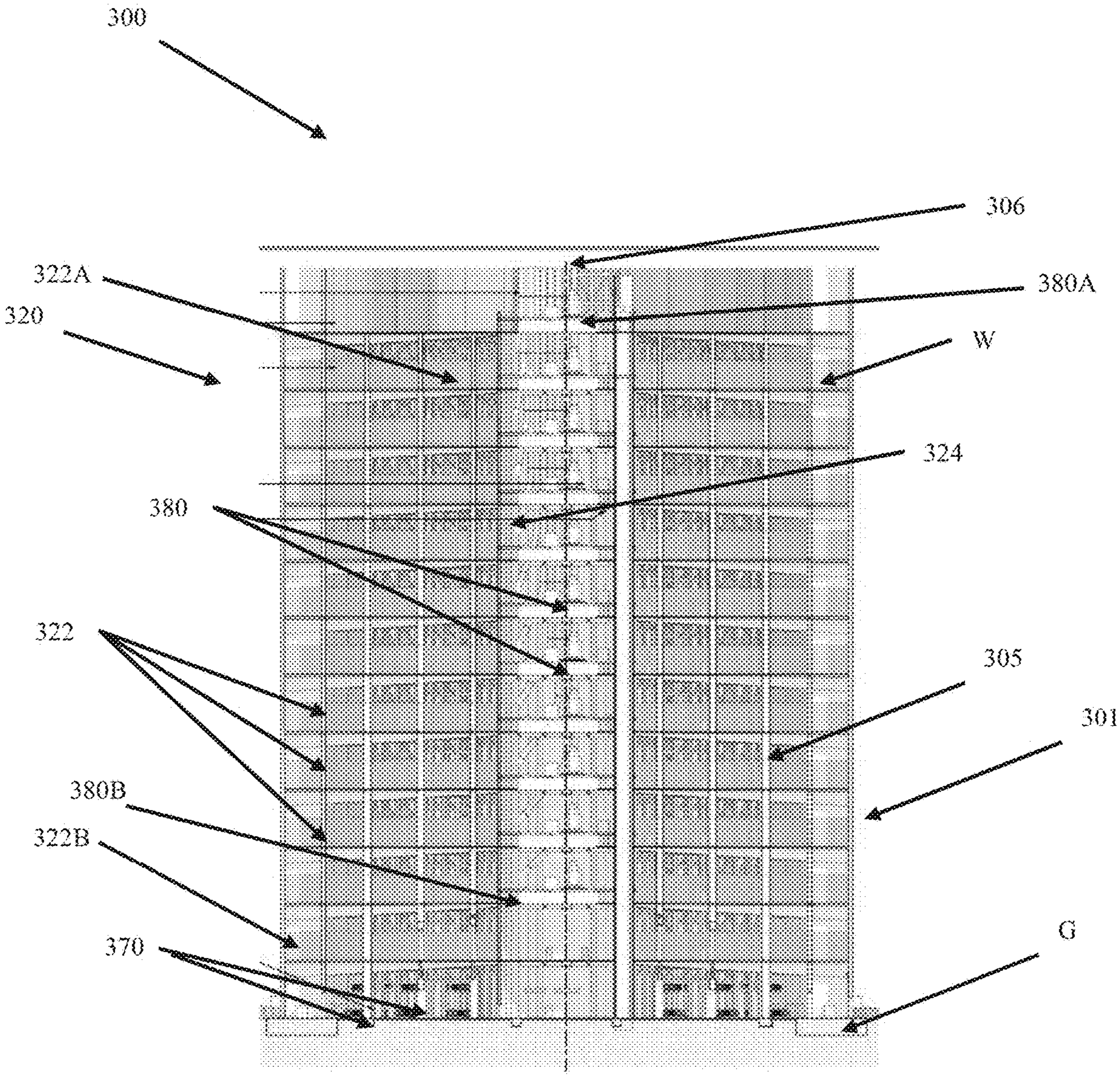
FIG. 11G is a schematic enlarged cross sectional view of a lower section of the energy storage tower.
Figure 11H:
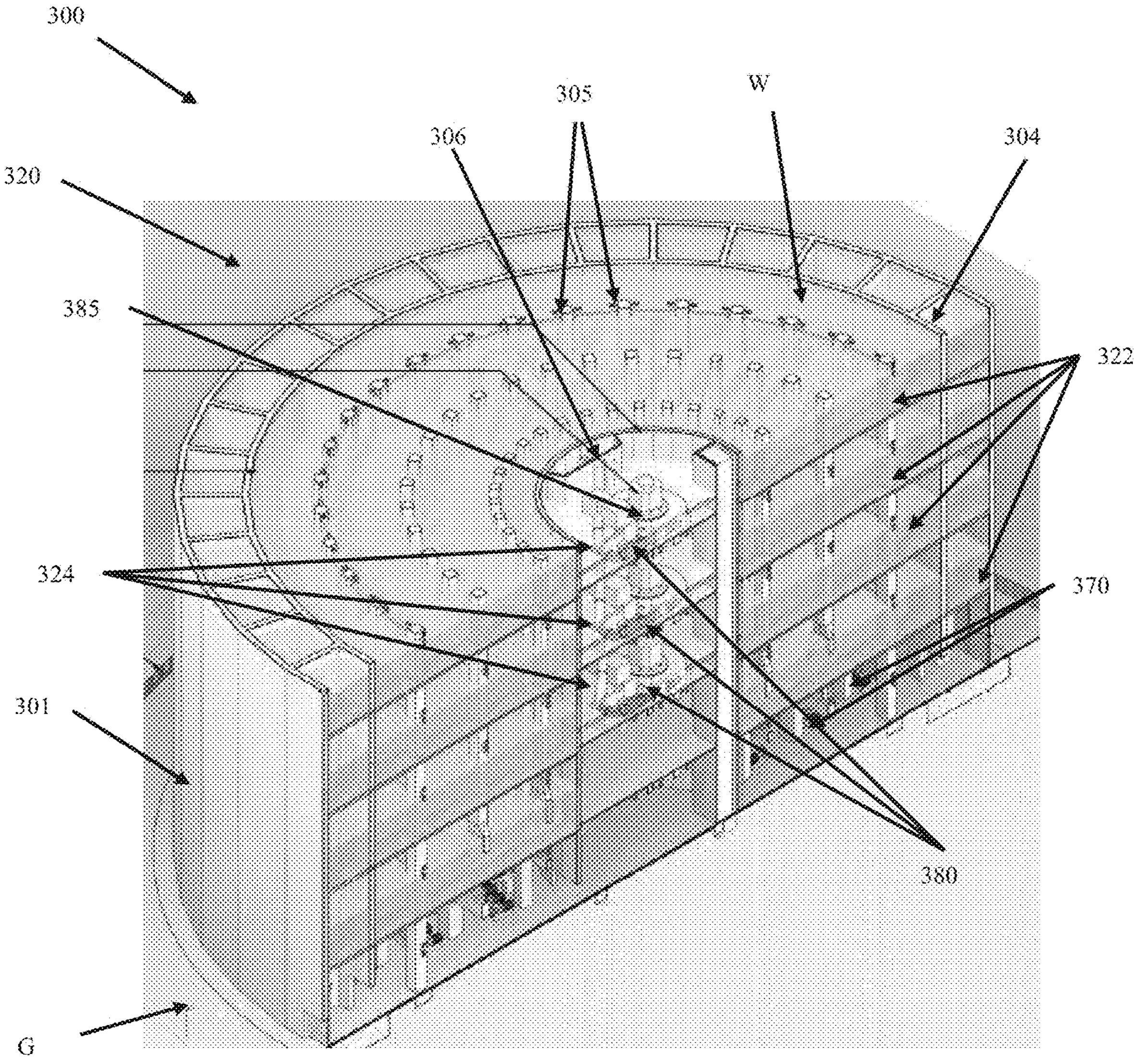
FIG. 11H is a schematic isometric cross-sectional view of a lower section of the energy storage tower.

FIG. 10A shows the tower 200 which can be coupled to an electric grid 290. The tower 200 can be a cylindrical tower (e.g., have a circular cross-section). The tower 200 may also be an elliptical or polygonal tower (e.g., have an oval or polygonal cross-section). The electric grid 290 can include a plurality of solar or photovoltaic (PV) panels or other types of power plants (e.g., nuclear, natural gas, etc.), substations, or distribution lines. The electric grid 290 can power certain aspects of the tower 200, as described further below. The tower 200 can operate as a battery (e.g., a 60 MWh battery, a 1 GWh battery or larger). The tower 200 can power an electric grid. FIG. 10B shows a cross section of the tower 200 which can in one example have a height H of approximately 600 meters and have an outer diameter OD of 100 meters. FIGS. 10C-10K show different cross-sectional views of the tower 200. The tower 200 can have an upper section 210, a lower section 220 vertically below the upper section 210, and an intermediate section 230 vertically between the upper section 210 and the lower section 220. The tower 200 can have a height H extending from a ground surface G (adjacent to the lower section 220) to an upper end of the upper section 210 of the tower 200. However, the height H of the tower 200 can vary (e.g., the tower 200 can have a height H between one hundred meters and 1000 meters). The tower 200 can have a constant, non-variable outer diameter OD along the height H of the tower. The tower 200 can, in some examples, have a varying outer diameter OD along the height H of the tower 200 (e.g., a hyperboloid tower). The tower 200 can be a modular tower. For example, the tower 200 can be constructed so that an additional floor or module can be built or placed above a prior floor or module (e.g., a new module can be constructed above a first set of floors or modules 212 and/or a second set of floors modules 222 to increase the height H of the tower).

With respect to FIGS. 10B-10K, the tower 200 can have a first set of floors or modules 212 in the upper section 210 and a second set of floors or modules 222 in the lower section 220. The first set of floors or modules 212 and the second set of floors or modules 222 can be filled with a liquid (e.g., can be filled with water W). To increase the height H of the tower 200, additional floors or modules can be added to the upper section 210, the intermediate section 230, and/or the lower section 220 of the tower 200 (e.g., the tower 200 is modular). The first set of floors or modules 212 and the second set of floors or modules 222 can be or provide water tanks. The first set of floors or modules 212 and the second set of floors or modules 222 can be waterproof (e.g., can be made of steel reinforced concrete, can have a waterproof lining) which can inhibit or prevent the water within the floors from leaking into other floors (e.g., lower floors) or leaking out of the tower 200 (e.g., external to the outer wall 201). The first set of floors or modules 212 and the second set of floors or modules 222 can be steel tanks or have a steel lining (e.g., to inhibit or prevent water from leaking out of the tower 200). The first set of floors or modules 212 can in one example include twelve floors. The second set of floors or modules 222 can also, in one example, include twelve floors. However, the number of floors in the first set of floors or modules 212 and the second set of floors or modules 222 can be any number of floors (e.g., ten, eleven, thirteen, etc.). The first set of floors or modules 212 and the second set of floors or modules 222 can be the same (e.g., equivalent). However, the number of floors in the first set of floors modules 212 and the second set of floors or modules 222 can be different (e.g., there may be two or three more floors in the second set of floors or modules 222 than the first set of floors or modules 212).

The first set of floors or modules 212 and the second set of floors or modules 222 can span (e.g., occupy) substantially all of an entire floor of the tower 200 (e.g., the topmost floor 212A of the first set of floors or modules 212 can be nearly entirely filled by water W). The first set of floors or modules 212 and the second set of floors or modules 222 may have an oculus or internal channel 206. The oculus or internal channel 206 can extend along the entire height H of the tower 200 (e.g., from a topmost region of upper section 210, entirely through the intermediate section 230, and to a bottommost region or ground G at the lower section 220). The first set of floors or modules 212 and the second set of floors or modules 222 can be radially filled with water from an outer wall 201 to the internal channel 206 (see FIGS. 10D-10E). The internal channel 206 can be empty or unfilled (e.g., no water W enters the oculus or internal channel 206). The internal channel 206 can have an inner diameter ID of 25 meters. Additionally, the internal channel 206 can contain equipment (e.g., electrical equipment) or space for an operator to travel through the tower (e.g., from the lower section 220 to the upper section 210). In some examples, the tower 200 excludes the oculus or internal channel 206.

The first set of floors or modules 212 and the second set of floors or modules 222 can be hydraulically connected. The first set of floors or modules 212 and the second set of floors or modules 222 can be hydraulically connected by a set of pipes 240. The set of pipes 240 can, in one example, be twelve pipes. The number of pipes 240 in the set of pipes 240 can correspond to the number of floors in the first set of floors or modules 212 and in the second set of floors or modules 222 since each pipe 240 extends between one floor in the first set of floors or modules 212 and one floor in the second set of floors or modules 222. Additionally, there may be multiple pipes of the set of pipes 240 extending to each floor of the first set of the floors or modules 212 and each floor of the second set of floors or modules 222. The number of pipes set of pipes 240 can be greater than the number of floors (e.g., the number of floors in the upper section 210).

The set of pipes 240 can extend along the tower 200 and along (e.g., proximate, adjacent) an inner wall 203 of the tower 200. For example, the set of pipes 240 can extend along the inner wall 203 of tower 200 in the intermediate section 230. The set of pipes 240 can have an upper region 214 and a lower region 224. The upper region 214 and lower region 224 may be positioned at various positions along the first set of floors or modules 212 and the second set of floors or modules 222 (e.g., proximate the inner wall 203, proximate the oculus or internal channel 206, proximate a middle region). The set of pipes 240 can move from the inner wall 203 and toward the oculus or internal channel 206 (e.g., radially away from the inner wall 203) before entering the lower section 220. Water W can flow between the upper section 210 to the lower section 220 by flowing between the upper region 214 and the lower region 224 of the set of pipes 240. For example, water W can travel from the topmost floor 212A, can enter and be received by the upper region 214 of the set of pipes 240, travel along the intermediate section 230 within the set of pipes 240, exit the lower region 224 of the set of pipes 240 and fill the topmost floor 222A of the second set of floors or modules 222. Additionally, the set of pipes 240 can extend along the inner wall 203 at the upper section 210, along or adjacent to the oculus or internal channel 206, and along the inner wall 203 at the lower section 220.

The first set of floors or modules 212 can be free of equipment (e.g., pumps, turbines). Each floor of the first set of floors or modules 212 and the second set of floors or modules may only have one pipe of the set of pipes 240 operable to deliver water W to the respective floor (e.g., one pipe of the set of pipes 240 can extend into the topmost floor 212A).

The lower section 220 can include a plurality of pumps 270. The plurality of pumps 270 can be positioned on a bottommost level 272 of the tower 200. The plurality of pumps 270 can be spaced radially around and radially outward of the oculus or internal channel 206 on the bottommost level 272. The plurality of pumps 270 may, in one example, be spaced around the oculus or internal channel 206 in three rows (e.g., radial rows). The bottommost level 272 is not filled or fillable with water W. The plurality of pumps 270 can in one example be five hundred pumps. The plurality of pumps 270 can also be scalable based on the size (e.g., height H) of the tower 200 (e.g., the plurality of pumps 270 can be fewer pumps (two hundred fifty pumps) if the tower 200 is shorter and the plurality of pumps 270 can be more pumps (seven hundred fifty pumps) if the tower 200 is taller). The plurality of pumps 270 can operate to pump the water from the lower section 220 to the upper section 210. For example, to move a flow of water from the lower section 220 to the upper section 210 a subset of the plurality of pumps 270 can be actuated (e.g., powered) to move a desired amount of water to the upper section 210. In one example, to move water from the topmost floor 222A of the second set of floors or modules 222 to the topmost floor 212A of the first set of floors or modules 212, approximately fifty pumps of the plurality of pumps 270 can be actuated. The plurality of pumps 270 can be actuatable by an electronic controller having one or more processors.

Each pump of the plurality of pumps 270 can be powered to pump water from each floor or module of the second set of floors or modules 222 (e.g., a specific or individual pump of the plurality of pumps 270 does not only pump fluid or water W from one floor or module of the second set of floors or modules 222). The plurality of pumps 270 can deliver energy (e.g., as potential energy) by moving fluid or water W from the second set of floors or modules to the first set of floors or modules 212 (e.g., by moving the water W from a lower elevation to a higher elevation). To move water W out of a floor of the second set of floors or modules 222, a group or subset of the plurality of pumps 270 can be allocated and can be powered (e.g., via power delivered by the electric grid 290 or another power source) such that water W can be pumped out of the desired floor of the second set of floors or modules 222 (e.g., bottommost floor 222B). For example, to move water out of a floor of the second set of floors or modules 222, a group (e.g., fifty) of the plurality of pumps 270 can be powered to move water W out of the bottommost floor 222B and to the upper section 210. To move water out of five floors of the second set of floors or modules 222, a larger group (e.g., 250 pumps) of the plurality of pumps 270 can be powered to move water to the upper section 210. In some examples, a set or portion of the plurality of pumps 270 can be positioned below each floor of the second set of floors or modules 222. To move liquid or water W out of a floor of the second set of floors or modules 222, the set or portion the plurality of pumps 270 below the floor of the second set of floors or modules (e.g., topmost floor 222A) can be powered (e.g., actuated) to move water W to the upper section 210.

The lower section 220 can include a plurality of turbines 280. The plurality of turbines 280 can in one example be 10 MW Pelton turbines or turbine-generators. The plurality of turbines 280 are equivalent to the number of second set of floors or modules 222 in the lower section 220 (e.g., twelve). Each turbine of the plurality of turbines 280 can be positioned above (e.g., a floor above) the floor where a respective pipe of the set of pipes 240 delivers water. For example, a bottommost floor 222B of the second set of floors or modules 222 can have a turbine 280B positioned above that floor. As water W flows through the set of pipes 240 (e.g., from the bottommost floor 212B of the first set of floors or modules 222) the water W can also flow past the turbine 280B positioned above the bottommost floor 222B. As water W flows past the turbine 280B and through the respective pipe of the set of pipes 240 to the bottommost floor 222B, the turbine 280B can be rotated by the flow of water to generate electricity (e.g., via an electric motor or generator 285). The energy generated (e.g., via the generator 285) by the plurality of turbines 280 can be stored and/or can be delivered to the electric grid 290.

The liquid or water W can be moved from the second set of floors or modules 222 in the lower section 220 and to corresponding floors of the first set of floors or modules 212 in the upper section 210 so that the plurality of pumps 270 (and the plurality of turbines 280 when the water W falls under a force of gravity) operate with the same pressure differential, which can increase the efficiency of operation. In some examples, the liquid can be moved from any floor of the first set of floors or modules 212 to any floor of the second set of floors or modules 222 (e.g., a non-corresponding floor) of the lower section 220. Advantageously, moving liquid from non-corresponding floors or modules 212, 222 of the upper section 210 and lower section 220 may generate desired amounts of energy during operation (e.g., by having liquid flow a desired distance corresponding to a potential or kinetic energy amount).

The tower 200 can have a plurality of columns 205 which can extend vertically through the upper section 210 and/or the lower section 220 (e.g., extend only in the lower section 220, extend in both the lower section 220 and upper section 210, extend only in the upper section 210). The plurality of columns 205 can be positioned radially around and radially outward of the oculus or internal channel 206 (or about a central axis of the tower 200). The plurality of columns 205 can support the upper section 210 and the lower section 220 of the tower 200. For example, the plurality of columns 205 can support the upper section 210 and/or the lower section 220 when filled with water W. The tower 200 may also have a plurality of walls 205A. The plurality of walls 205A may extend vertically in each floor of the first set of floors modules 212. In another example, each floor of the second set of floors 222 can have a similar plurality of walls. The plurality of walls 205A may extend radially outward from the oculus or internal channel 206 (or central axis of the tower 200) and to the inner wall 203. The plurality of walls 205A may support the upper section 210 when filled with water W. In some examples, the lower section 220 may include the plurality of walls 205A. The plurality of walls 205A may be tapered walls (e.g., the width of the wall increases as the plurality of walls 205A extend radially outward from the center of the tower 200). The tower 200 can also have a plurality of beams 205B. The plurality of beams 205B may be positioned in the center of the tower 200 (e.g., around the oculus or internal channel 206 or central axis of the tower 200). The plurality of beams 205B may support or have the set of pipes 240 extending through (e.g., vertically through) the plurality of beams 205B. The tower 200 can also have a plurality of girders 205C (e.g., beams) at the floors or modules 222 extending between the plurality of columns 205. The plurality of girders 205C may provide additional structural support for the lower section 220.

The tower 200 can have a cellular structure 204 forming the space or region between the outer wall 201 and the inner wall 203. The cellular structure 204 can extend radially along the outer wall 201 (e.g., extend circumferentially about a central axis of the tower 200). The cellular structure 204 can include a plurality of cells 208 having a rectangular or square shape or supporting structures extending radially along the outer wall 201. The cells 208 may also be trapezoidal or polygonal. The cellular structure 204 can provide stability for the tower 200. Advantageously, the cellular structure 204 allows the tower 200 to be built with minimal material (e.g., concrete) while providing stability. Additionally, the cellular structure 204 allows the tower 200 to be built rapidly (e.g., in a few weeks or a few months). Since the cellular structure 204 can allow the tower 200 to be built with minimal material and quickly, the costs required to build the tower 200 (e.g., labor costs) may be reduced. The tower 200 may include thirty-cells 208 which extend around (e.g., radially, circumferentially about a central axis of) the tower 200. However, the tower 200 may also include more or fewer cells 208 (e.g., four cells, eight cells, sixteen cells, thirty-two cells, forty cells, sixty-four cells, etc.). The cellular structure 204 may be present in the upper section 210 and the lower section 220. The cellular structure 204 can be multiple cellular structures 204 where a second cellular structure can be inward (e.g., radially inward) of a first cellular structure. Water W that may be present in the first set of floors or modules 212 and the second set of floors or modules 222 may flow into the cellular structure 204. Advantageously, the cellular structure 204 may provide stability for the tower 200 while permitting additional space (e.g., the radially outward regions of an individual floor of the first set of floors or modules 212) for storage of water W. In some examples, the tower 200 may be free of (e.g., not include) a cellular structure 204 and is supported by the outer wall 201.

The tower 200 can optionally have a plurality of exterior structures 260. The exterior structures 260 can be radially outward (e.g., external to) of the outer wall 201. The plurality of exterior structures 260 can be positioned at the upper section 210. The plurality of exterior structures 260 can be located at each floor of the first set of floors or modules 212. The plurality of exterior structures 260 can be a plurality of tension rings to provide structural support for the upper section 210. The plurality of exterior structures 260 can impart a radial force on the upper section 210 (e.g., to prevent the upper section 210 from warping or expanding when filled with water W). The plurality of exterior structures 260 can also be a work platform which can allow for workers to inspect or perform maintenance on the upper section 210 of the tower 200. In some examples, there may be structures positioned within the tower 200 (e.g., structures may extend radially inward of the inner wall 203).

A process for storing or generating energy using the tower 200 can include storing water W in the first set of floors or modules 212 (e.g., by pumping water via the pump(s) 270 and pipes 240 from the lower section 220 to the upper section 210). The water W stored in each of the floors of the first set of floors or modules 212 can store energy as potential energy. The water in each of the floors of the first set of floors or modules 212 can be stored by closing valves (e.g., valves located at the upper region 214 of the set of pipes 240 in each of first set of floors or modules 212). When all of the first set of floors or modules 212 are filled with water W, the tower 100 is in a maximum energy storage state. To generate electricity, the water W present in the upper section 210 can flow to the lower section 220. For example, the water W present in the topmost floor 212A can flow out of its pipe (e.g., through the upper region 214 of the pipe 240 for 212A) and flow through the pipe 240 to the lower section 220 under a force of gravity. As the water W flows from the upper section 210 (e.g., at the topmost floor 212A), the water W can flow past turbine 280A located above the topmost floor 222A and rotate the turbine 280A before entering the topmost floor 212A (e.g., through the lower region 224 of the pipe of the set of pipes 240). Rotating the turbine 280A can generate electricity. The generated electricity (e.g., via the generator 285) can be delivered to the electric grid 290. Each floor of the first set of floors or modules 212 of the upper section 210 can also have water flow through the set of pipes 240 and past the plurality of turbines 280 located above respective floors of the second set of floors or modules 222 to generate additional electricity. The lower region 224 of the set of pipes 240 may also have a valve to close or seal water in each floor of the second set of floors or modules 222. The valves can be actuated (e.g., opened or closed) by an electronic controller or processor. Advantageously, the tower 200 can be operated to continuously generate electricity and/or store energy. For example, electricity can be continuously generated (via the turbines 280 and generator 285) by moving water sequentially from different floors in the upper section 210 to corresponding floors in the lower section 220, or energy can be continuously stored by moving water (with the pumps 270) sequentially from different floors in the lower section 220 to corresponding floors in the upper section 210.

To store energy, the water W in the lower section 220 can be pumped from the lower section 220 to the upper section 210. The plurality of pumps 270 can be selectively actuated in order to deliver a desired amount of energy (as potential energy) to a particular floor or number of floors of the second set of floors or modules 222. For example, to move water from the lower section 220 to the upper section 210 to store one floor's or module's worth of energy, a group or subset of the plurality of pumps 270 (e.g., fifty pumps) can be actuated to pump water from the bottommost floor 222B through a pipe of the set of pipes 240 and to the topmost floor 212A. Valves located in the set of pipes 240 (e.g., at the lower region 224 and the upper region 214) can open in order to allow the water W to be pumped from the bottommost floor 212B to the topmost floor 212A. To store additional energy, more of the pumps (e.g., one hundred) or all pumps of the plurality of pumps 270 (e.g., all five hundred pumps) can be actuated (e.g., turned on, powered) to pump water W from each floor of the second set of floors or modules 222 through each pipe of the set of pipes 240 and to each floor of the first set of floors or modules 212. Additionally, the valves in the lower region 224 and upper region 214 can open to allow the water to flow from the lower section 220 to the upper section 210. Once the respective floor of the first set of floors or modules 212 is filled with water, the respective valve at the upper region 214 of the pipe of the set of pipes 240 can close to seal or store the water. The plurality of pumps 270 can be electrically coupled to and powered by the electric grid 290.

FIGS. 11A-11H show features of an energy storage tower 300 (e.g., a single tower, hereafter the "tower"). Some of the features of the tower 300 are similar to the features of the tower 100 in FIGS. 1-6, the tower 100' of FIG. 7, the tower 100'' of FIG. 8, the tower 100''' of FIG. 9, and the tower 200 of FIGS. 10A-10K. Thus, reference numerals used to designate the various components of the tower 200 are identical to those used for identifying the corresponding components of the tower 100 in FIGS. 1-6, the tower 100' of FIG. 7, the tower 100'' of FIG. 8, the tower 100''' of FIG. 9, and tower 200 of FIG. 10A-10K, except that a “3” has replaced a “1” or a “2” at the beginning of the numerical identifier. Therefore, the structure and description for the various features of the towers 100, 100', 100'', 100''', and 200 and how they are operated and controlled are understood to also apply to the corresponding features of the tower 300, except as described below. For example, the tower 300 has an outer wall 301, an inner wall 303, a cellular structure 304, a plurality of columns 305, a plurality of walls 305A, cells 308, an upper section 310, a lower section 320, floors or modules 312, 322, a plurality of pumps 370, and a plurality of turbines 380.

The tower 300 differs from the tower 200 in that the set of pipes 340 can extend from the upper section 310 and to the lower section 320 through the center of the tower 300 (e.g., adjacent to or through the oculus or internal channel 306) instead of along the inner wall 303 or interposed between the outer wall 301 and inner wall 303. The center of the tower 300 may be filled or solid (e.g., a steel or concrete center, a center free of any vertical or horizontal openings or channels). The set of pipes 340 can extend through a wall or channel external to the internal channel 306. The set of pipes 340 can be adjacent to an intermediate structure 335. The intermediate structure can support the set of pipes 340. The intermediate structure 335 may also allow users or operators to move material from the upper section 310 to the lower section 320 or vice versa. The set of pipes 340 can extend from the upper region 314 of each floor of the first set of floors or modules 312, through the intermediate section 330, and to the lower region 324 of each floor of the second set of floors or modules 322. The liquid or water W can flow through the set of pipes 340 and past the plurality of turbines 380 positioned above the floor where a respective pipe of the set of pipes 340 delivers water W. As the water W falls under a force of gravity from the upper section 310 (e.g., from the topmost floor 312A, from the bottommost floor 312B) to a respective floor of the lower section 320 (e.g., topmost floor 322A, bottommost floor 322B) through the set of pipes 340, the water W can flow past a turbine (e.g., turbine 380A, turbine 380B) to generate electricity (via an electric motor-generator 385). Additionally, the water W can be pumped from the lower section 320 via the plurality of pumps 370 from one or all of the second set of floors or modules 322, through the set of pipes 340 and to the upper section 310. Advantageously, the water W pumped (via the plurality of pumps 370) can be pumped a shorter distance (e.g., vertical distance) if the set of pipes 340 extend through the center (e.g., adjacent the internal channel 306) of the tower 300.

FIGS. 12A-12D show features of an energy storage tower 400 (e.g., a single tower, hereafter the “tower”). Some of the features of the tower 400 are similar to the features of the tower 100 in FIGS. 1-6, the tower 100' of FIG. 7, the tower 100'' of FIG. 8, the tower 100''' of FIG. 9, the tower 200 of FIGS. 10A-10K, and the tower 300 of FIGS. 11A-11H. Thus, reference numerals used to designate the various components of the tower 200 are identical to those used for identifying the corresponding components of the tower 100 in FIGS. 1-6, the tower 100' of FIG. 7, the tower 100'' of FIG. 8, the tower 100'' of FIG. 9, the tower 200 of FIGS. 10A-10K, and the tower 300 of FIGS. 11A-11H, except that a “4” has replaced a “1” a “2” or a “3” at the beginning of the numerical identifier. Therefore, the structure and description for the various features of the towers 100, 100', 100'', 100''', 200, and 300 and how they are operated and controlled are understood to also apply to the corresponding features of the tower 400, except as described below. For example, the tower 400 has an outer wall 401, an inner wall 403, an upper section 410, a lower section 420, an intermediate section 430, floors or modules 412, a plurality of pumps 470, and a turbine 480.

Figure 12A:
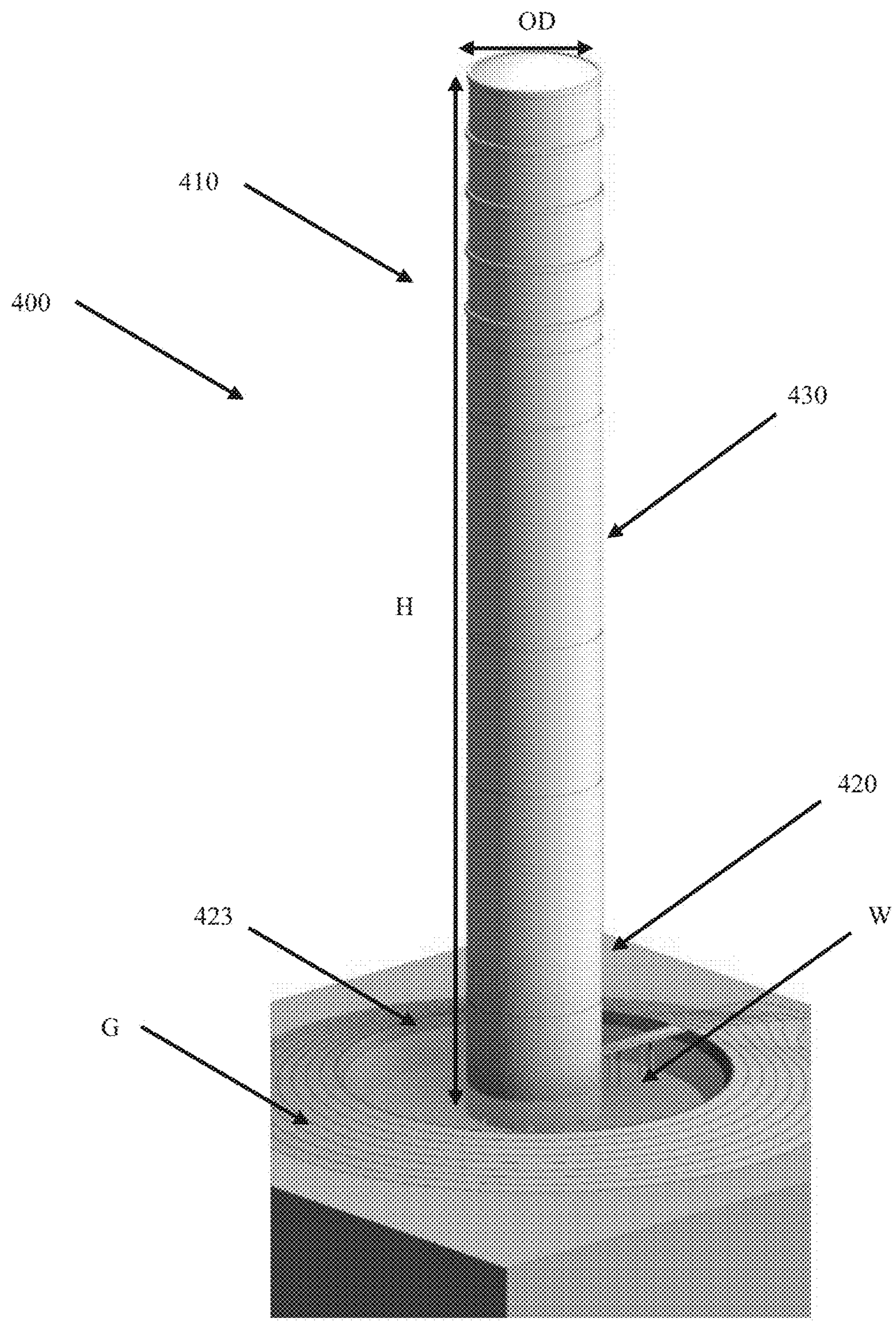
FIG. 12A is a schematic isometric view of an energy storage tower.

FIG. 12A shows the tower 400. The tower 400 can be a cylindrical tower (e.g., have a circular cross-section). The tower 400 can be made of concrete. The tower 400 may also be an elliptical or polygonal tower (e.g., have an elliptical or polygonal cross-section). The tower 400 can operate as a battery (e.g., a 60 MWh battery, a 1 GWh battery or larger). The tower 400 can power an electric grid. The tower 400 can in one example have a height H of approximately 340 meters. Additionally, the tower 400 can be taller or shorter (e.g., the tower 400 can be 300 meters, 600 meters, or 1000 meters). The tower 400 can in one example have an outer diameter OD of approximately 37 meters. However, the outer diameter OD of the tower 400 can vary (e.g., the tower 400 can have an outer diameter OD of approximately 20 meters, 30, meters, 40 meters, or 50 meters). The tower 400 can, in some examples, have a varying outer diameter OD along the height H of the tower 400 (e.g., a hyperboloid tower). The tower 400 can have an upper section 410, a lower section 430, and an intermediate section 430 interposed between the upper section 410 and the lower section 420. The diameter of the intermediate section 430 can be, in some examples, smaller than the diameter of the upper section 410 and/or lower section 420.

The tower 400 can be in or proximate a reservoir 423. For example, the lower section 420 of the tower 400 may extend from (e.g., surrounded by, submerged in) the reservoir 423. The reservoir 423 may be filled with a liquid, such as water W. The reservoir 423 may be a man-made reservoir (e.g., an impoundment, artificial lake, basin, water storage facility, hydraulic reservoir) or natural body of water, such as a lake. The liquid or water W in the reservoir 423 may fill a portion of the lower section 420. The reservoir 423 may be submerged below a ground surface G.

Figure 12B:
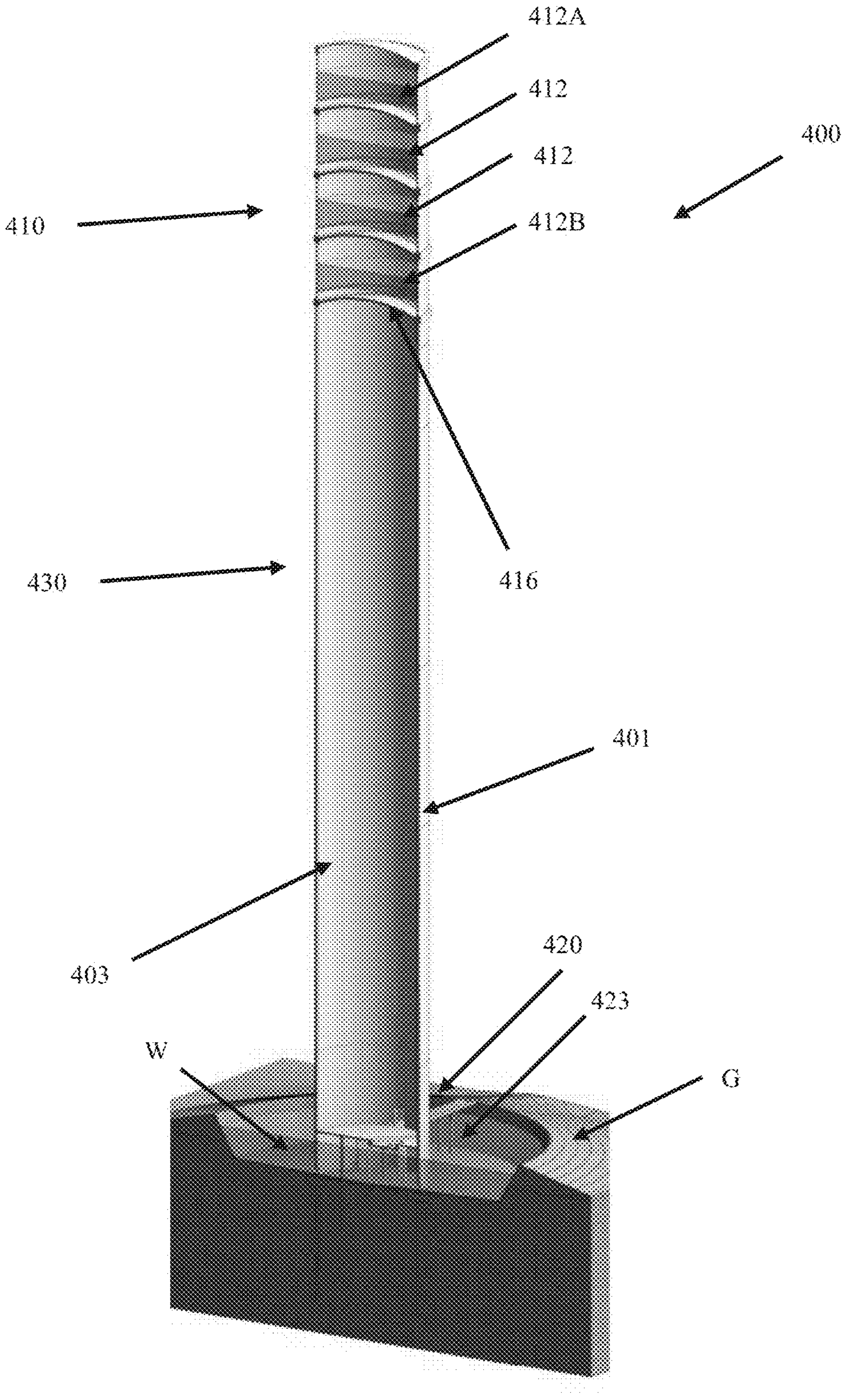
FIG. 12B is a schematic isometric cross-sectional view of the tower of FIG. 12A along the height of the energy storage tower.

FIG. 12B shows a cross-section of the tower 400 extending vertically upward from the lower section 420 to the upper section 410. The tower 400 can have an outer wall 401 and an inner wall 403 inward (e.g., radially inward) of the outer wall 401. The outer wall 401 and inner wall 403 can be a single wall structure or a cellar structure (e.g., cellular structure 204 extending between the outer wall 401 and the inner wall 403).

The tower 400 can have a plurality of floors or modules 412 at the upper section 410. For example, and as shown in FIG. 12B, the upper section 410 can have four floors or modules 412. In other examples, the upper section 410 may have more or fewer floors of modules 412 (e.g., two floors, six floors, eight floors, ten floors, twelve floors). The plurality of floors of modules 412 may be free of equipment. The plurality of floors or modules 412 may be tanks or water tanks. The plurality of floors or modules 412 may be partially or completely filled with water inward (e.g., radially inward) of the inner wall 403 (e.g., the tower 400 may not include a central channel or oculus as described above). The water W in the plurality of floors or modules 412 may sit on a surface or domed surface 416. The domed surface 416 may be steel or concrete. The plurality of floors or modules 412 may contain a volume of water W. The volume of water W may in one example be equivalent to 74,000 cubic meters of water W when the tower 400 is completely filled.

The upper section 410 may be hydraulically connected to the lower section 420. For example, the plurality of floors or modules 412 in the upper section 410 may have a set of pipes (e.g., similar to the pipes disclosed above, the set of pipes 240, 340). The pipes can extend from the upper section 410 and to each floor or the plurality of floors or modules 412. The plurality of floors or modules 412 can have multiple pipes extending to each floor. The plurality of floors or modules 412 can have one or more pipes extending from various positions along the floors or modules and to the upper section 410 (e.g., there may be pipes that extend from a central region, a middle region, and/or an outer region of the floors or modules 412). Water W can travel from the plurality of floors or modules 412, through the pipes, and to the reservoir 423 at the lower section 420. Additionally, water W can be pumped from the reservoir 423 at the lower section 420, through the pipes and to one or more floors of the plurality of floors or modules 412 at the upper section 410. For example, water W can travel from the topmost floor 412A, can enter and be received by the pipes, can travel along the intermediate section 430 within the pipes, and can exit into the reservoir 423. Additionally, water W can travel from the bottommost floor 412B, can enter and be received by the pipes, travel along the intermediate section 430 within the pipes, and to the reservoir 423. As discussed further below, the distance travelled by the water W can correspond to an amount of energy that can be stored or generated.

Figure 12C:
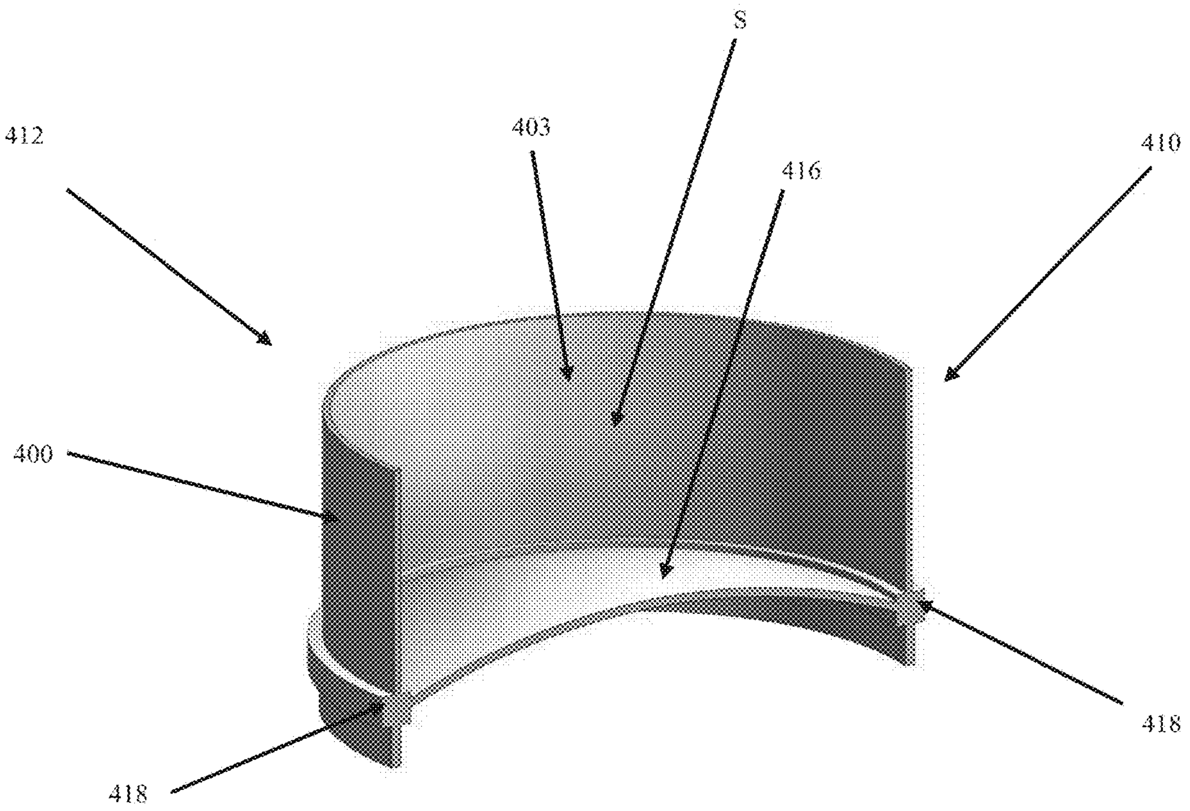
FIG. 12C a schematic enlarged cross sectional view of an upper section of the energy storage tower of FIG. 12A.

FIG. 12C shows an isolated isometric view of an individual floor of the floors or modules 412 of the upper section 410. The surface or domed surface 416 can extend radially inward from the inner wall 403. The domed surface 416 can extend entirely along (e.g., occupy entirely) a floor of the plurality of floors of modules 412. Water W can fill the space S between two vertically adjacent domed surface 416. The domed surface 416 may extend from a ring beam 418. The ring beam 418 may extend around or along (e.g., circumferentially around or along) the outer wall 401. The ring beam 418 can help absorb some of the forces (e.g., weight of water W when the floor or module is filled or partially filled) exerted on the domed surface 416 of the plurality of floors or modules 412. The ring beam 418 can be under tension (e.g., a tension beam) due to the weight of the water W exerted on the domed surface 416 causing the domed surface 416 to exert a radially outward force on the ring beam 418. The ring beam 418 can be pre-compressed. The domed surface 416 can be curved or domed due to a compression force (e.g., pre-compression force) being exerted (e.g., radially exerted) on the domed surface 416 in order to withstand the weight of the water W.

Figure 12D:
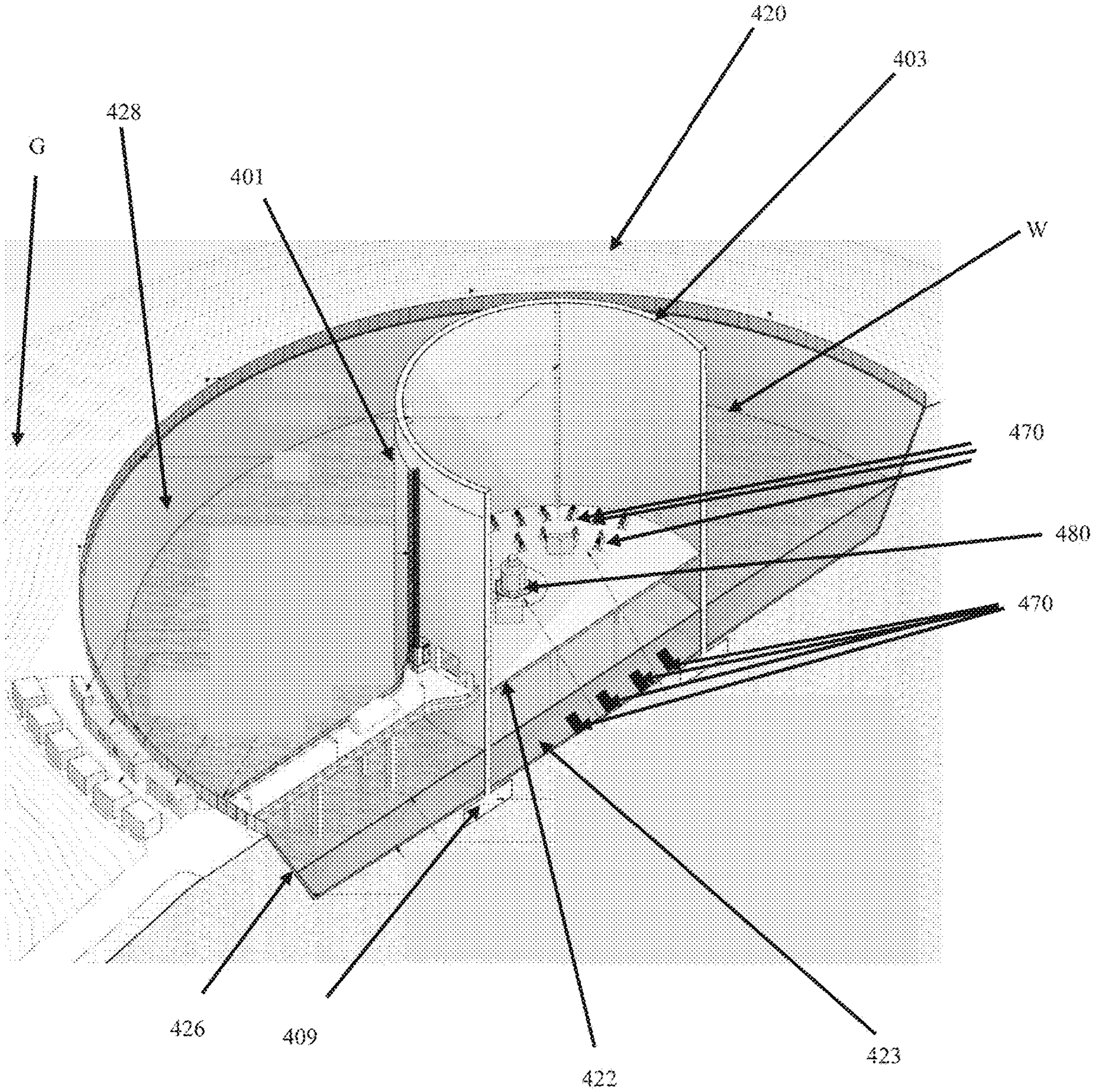
FIG. 12D is a schematic isometric cross-sectional view of a lower section of the energy storage tower of FIG. 12A.

FIG. 12D shows an isometric view of the lower section 420 of the tower 400. The lower section 420 may include a plurality of pumps 470. The plurality of pumps 470 can be positioned on a bottom surface 422 of the lower section 420. The plurality of pumps 470 can be positioned on or at the bottom of the reservoir 423. In some examples, the plurality of pumps 470 are only in the reservoir 423 (e.g., positioned on a bottom surface of the reservoir 423) and are not positioned on the bottom surface 422. The plurality of pumps 470 may be spaced radially around and radially inward of the inner wall 403. The plurality of pumps 470 may be three groups of pumps spaced radially inward of the inner wall 403. Although not shown, the lower section 420 can optionally also have a plurality of floors or modules (e.g., floors or modules 222) that can optionally store water and that can be pumped to the upper section 410.

The reservoir 423 may be positioned underneath the bottom surface 422 and surround the lower section 420 (e.g., be outside or partially outside of the inner wall 403). Water W can flow from outside the inner wall 403 to an area underneath the bottom surface 422 and can be pumped from the lower section 420 (e.g., via the reservoir 423) and to the upper section 410 via the plurality of pumps 470. The volume of water W in the reservoir 423 may be greater than the maximum amount of water W that can be stored in the plurality of floors or modules 412 in the upper section 410. The reservoir 423 may have a reservoir liner 426. The reservoir liner 426 may be a clay liner, a geosynthetic liner, a membrane liner, a textile liner, and/or a drainage layer. The reservoir 423 may be surrounded by a reservoir wall 428. A portion of the tower 400 or a structural support 409 may extend below the reservoir 423.

The plurality of pumps 470 can, in one example, be thirty pumps. The plurality of pumps 470 can also be scalable based on the size (e.g., height H) of the tower 400 (e.g., the plurality of pumps 470 can be fewer pumps (ten pumps) if the tower 400 is shorter and the plurality of pumps 470 can be more pumps (five hundred pumps) if the tower 400 is taller). The plurality of pumps 470 can operate to pump the water from the lower section 420 to the upper section 410. For example, to move a flow of water from the lower section 420 to the upper section 410 a subset of the plurality of pumps 470 can be actuated (e.g., powered) to move a desired amount of water to the upper section 410. In one example, to move water from the reservoir 423 to the topmost floor 412A of the plurality of floors or modules 412, approximately one third of the pumps of the plurality of pumps 470 can be actuated. To move water W out of a different floor of the floors or modules 412, a different group (e.g., fifteen) of the plurality of pumps 470 can be powered to move water W out of the reservoir 423 and to the upper section 410. A set of pumps of the plurality of pumps 470 can be allocated and actuated based on the distance the water W has to travel along the tower 400 (e.g., the distance from the topmost floor 412A to the reservoir 423). To fill all of the floors of the plurality of floors or modules 412 with fluid or water W from the reservoir 423, all of the plurality of pumps 470 can be actuated. The plurality of pumps 470 can be actuatable by an electronic controller having one or more processors.

The lower section 420 can include one or more turbines 480. The one or more turbines 480 can in one example be 5 MW Pelton turbines or turbine-generators. The one or more turbines 480 may be positioned on the bottom surface 422. The one or more turbines turbine 480 may be positioned above the reservoir 423. As water W flows through pipes at the upper section 410 (e.g., bottommost floor 412B) the water W can flow past the turbine 480 and to the reservoir 423 to generate energy (e.g., via a generator electrically connected to the turbine(s) 480 that generate electricity as the flowing water rotates the turbine(s) 480). The energy generated by the one or more turbines 480 can be stored (e.g., in one or more batteries) and/or can be delivered to an electric grid.

Figure 13:
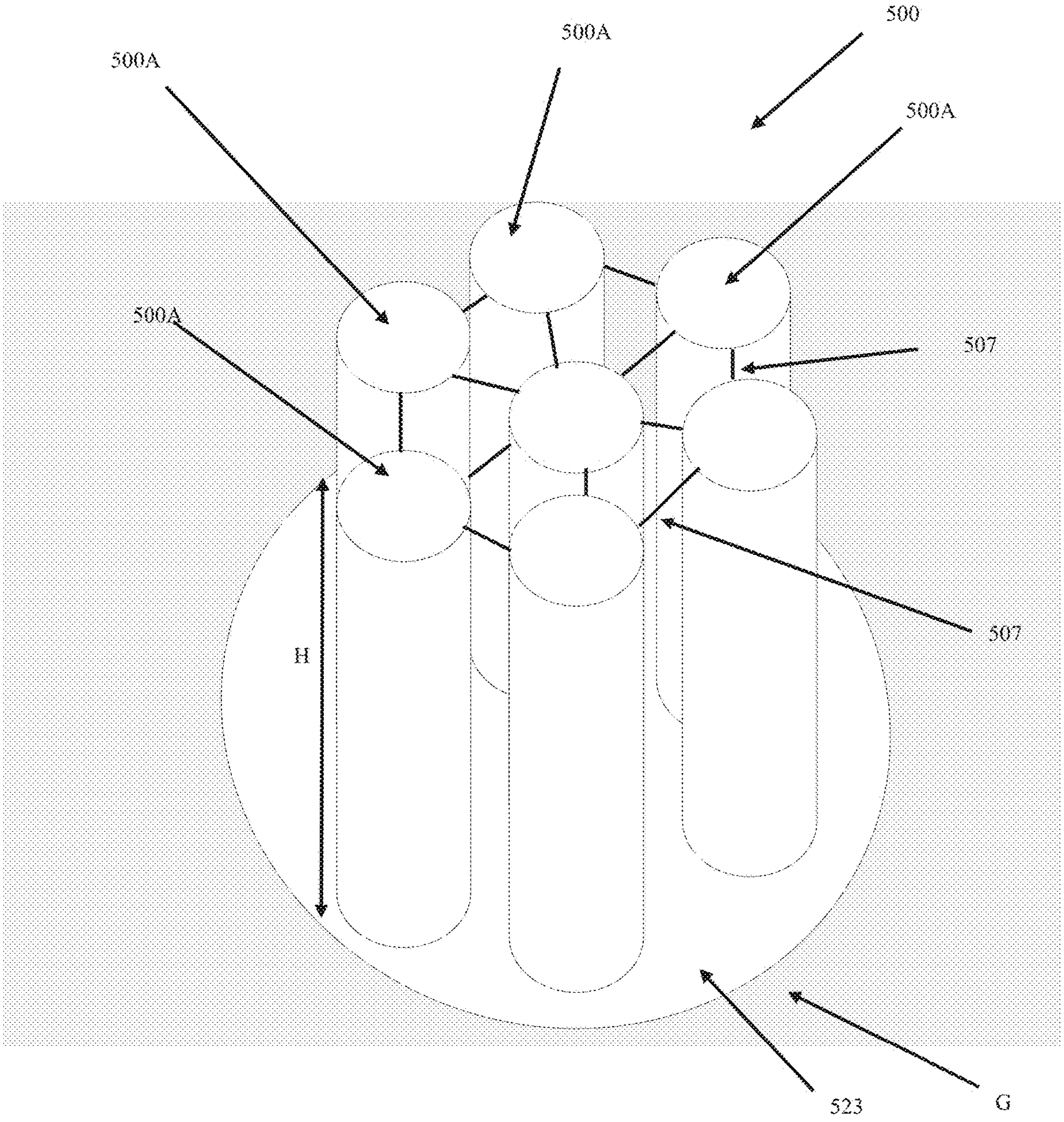
FIG. 13 is a schematic illustration of a plurality of energy storage towers.

FIG. 13 shows features of energy storage towers 500. Some of the features of the towers 500 are similar to the features of the tower 100 in FIGS. 1-6, the tower 100' of FIG. 7, the tower 100" of FIG. 8, the tower 100'" of FIG. 9, the tower 200 of FIGS. 10A-10K, the tower 300 of FIGS. 11A-11H and the tower 400 of FIGS. 12A-12D. Thus, reference numerals used to designate the various components of the towers 500 are identical to those used for identifying the corresponding components of the tower 100 in FIGS. 1-6, the tower 100' of FIG. 7, the tower 100" of FIG. 8, the tower 100''' of FIG. 9, the tower 200 of FIGS. 10A-10K, the tower 300 of FIGS. 11A-11H, and the tower 500 of FIGS. 12A-12D except that a "5" has replaced a "1" a "2" a "3" or a "4" at the beginning of the numerical identifier. Therefore, the structure and description for the various features of the towers 100, 100', 100", 100''', 200, 300, and 400 and how they are operated and controlled are understood to also apply to the corresponding features of the towers 500, except as described below.

The towers 500 can be a plurality of towers 500A (e.g., seven towers 500A). The towers 500 can be shorter than the towers disclosed above. For example, each tower 500A can have a height H of approximately 300 meters. Advantageously, the combination of each tower 500A as a system of towers 500 in FIG. 13 can operate as a battery (e.g., a 60 MWh battery, a 1 GWh battery or larger). Having each tower 500A be numerous smaller or shorter towers can make it easier to build the towers and reduce construction complexity. Each tower 500A can be structurally connected to each other via a support 507. The support 507 can be a cable or wire (e.g., a steel wire). The towers 500 can be positioned within a reservoir 423. Water from the reservoir 523 can be used to store and generate electricity as disclosed above.

In one example, the tower 100, 100', 100", 100"", 200, 300, 400, and 500 can be used as thermal storage for cold or hot water. For example, the water in the tower 100, 100', 100", 100" 200, 300, 400, and 500 can be cooled (e.g., overnight), for example to 15° C. or less (e.g. via radiative heat transfer to the sky), and the cooled water can be used in daytime to cool residential or commercial units (e.g., computer datacenters), advantageously conserving energy, for example, by reducing the amount of energy (e.g., electricity) needed for air conditioning of said residential or commercial units.

Additional Embodiments

In embodiments of the present disclosure, an underwater turbine and method of operation and/or a system for generating electricity from an underwater ocean stream may be in accordance with any of the following clauses:

Clause 1. An energy storage tower, comprising: a lower section; an upper section comprising a plurality of floors, each floor of the plurality of floors is configured to be selectively filled with a liquid; a set of pipes hydraulically coupling the lower section and the plurality of floors; a plurality of pumps positioned at the lower section and hydraulically coupled to the set of pipes; and a turbine positioned at the lower section and hydraulically coupled to the set of pipes; wherein the plurality of pumps are operable to pump the liquid from the lower section to one or more of the plurality of floors to store energy as potential energy; and wherein the turbine is operable to generate electricity from a flow of the liquid through the set of pipes from the plurality of floors to the lower section under a force of gravity.

Clause 2. The energy storage tower of Clause 1, wherein the lower section comprises a plurality of lower floors, each floor of the plurality of lower floors configured to be filled with the liquid.

Clause 3. The energy storage tower of Clauses 1-2, wherein the set of pipes comprise a set of valves, the set of valves actuatable from a closed position to an open position, wherein when in he open position the set of valves allow liquid flow to and from the plurality of floors and wherein when in the closed position the set of valves disallow liquid flow to and from the plurality of floors.

Clause 4. The energy storage tower of Clauses 1-3, wherein the plurality of pumps are positioned on a bottom floor of the energy storage tower.

Clause 5. The energy storage tower of Clauses 1-4, further comprising a reservoir at the lower section, wherein the liquid from the plurality of floors in the upper section flows into the reservoir.

Clause 6. The energy storage tower of Clauses 1-5, wherein the reservoir extends outside an outer wall of a tower body.

Clause 7. The energy storage tower of Clause 5, wherein the plurality of pumps are positioned in the reservoir, wherein the plurality of pumps are operable to pump the liquid from the reservoir to the plurality of floors in the upper section.

Clause 8. The energy storage tower of any of Clauses 1-7, wherein the plurality of pumps are selectively actuatable to pump a desired amount of the liquid from the lower section to the upper section.

Clause 9. The energy storage tower of any of Clauses 1-8, wherein a cylindrical cellular structure is positioned along an outer wall of a tower body.

Clause 10. The energy storage tower of any of Clauses 1-9, wherein each floor of the plurality of floors includes a pipe, the pipe configured to receive the liquid therethrough.

Clause 11. The energy storage tower of any of Clauses 1-10, wherein each floor of the plurality of floors is a storage tank.

Clause 12. The energy storage tower of any of Clauses 1-8, wherein a central channel extends between the upper section and the lower section along a height of a tower body.

Clause 13. The energy storage tower of Clause 12, wherein the central channel is free of the liquid.

Clause 14. The energy storage tower of any of Clauses 1-13, further comprising an electric motor-generator electrically coupled to the turbine.

Clause 15. The energy storage tower of any of Clauses 1-14, wherein the energy storage tower is operable to continuously generate electricity.

Clause 16. An energy storage tower, comprising: a lower section comprising a first plurality of modules, each module of the first plurality of modules is configured to be filled with a liquid; an upper section comprising a second plurality of modules, each module of the second plurality of modules is configured to be selectively filled with the liquid; a set of pipes hydraulically coupling the first plurality of modules and the second plurality of modules, each pipe of the set of pipes extending to each module of the first plurality of modules and the second plurality of modules; a plurality of pumps hydraulically connected to the first plurality of modules; and a plurality of turbines, each of the plurality of turbines positioned vertically above each module of the first plurality of modules and hydraulically coupled to the set of pipes, wherein the plurality of pumps are operable to pump the liquid from each module of the first plurality of modules to the second plurality of modules to store energy as potential energy, and wherein the plurality of turbines are operable to generate electricity from a flow of the liquid through the set of pipes from the second plurality of modules to the first plurality of modules under a force of gravity.

Clause 17. The energy storage tower of Clause 15, wherein the set of pipes comprise a set of valves, the set of valves actuatable from a closed position to an open position, wherein when in the open position, the set of valves allow liquid flow to and from the first plurality of modules, and wherein when in the closed position the set of valves disallow liquid flow to and from the first plurality of modules.

Clause 18. The energy storage tower of any of Clauses 15-16, wherein the plurality of pumps are positioned on a bottom floor of the energy storage tower.

Clause 19. The energy storage tower of any of Clauses 15-17, wherein the plurality of pumps are selectively actuatable to pump a desired amount of the liquid from the lower section to the upper section.

Clause 20. The energy storage tower of any of Clauses 15-18, wherein a cylindrical cellular structure is positioned along an outer wall of a tower body.

Clause 21. The energy storage tower of any of Clauses 15-19, wherein each module of the first plurality of modules and the second plurality of modules is a storage tank.

Clause 22. The energy storage tower of any of Clauses 15-20, wherein an inner channel extends between the upper section and the lower section along a height of a tower body and is free of the liquid.

Clause 23. The energy storage tower of any of Clauses 15-21, wherein the set of pipes extend from the upper section to the lower section along an inner wall of a tower body.

Clause 24. An energy storage tower, comprising: a lower section comprising a first plurality of modules, each module of the first plurality of modules is configured to be filled with a liquid; an upper section comprising a second plurality of modules, each module of the second plurality of modules is configured to be selectively filled with the liquid; a set of pipes hydraulically coupling the first plurality of modules and the second plurality of modules, each pipe of the set of pipes extending to each module of the first plurality of modules and the second plurality of modules, each pipe of the set of pipes hydraulically coupled to a turbine of a plurality of turbines; and a plurality of pumps hydraulically connected to the first plurality of modules, wherein the plurality of pumps are operable to pump the liquid from each module of the first plurality of modules to the second plurality of modules to store energy as potential energy, and wherein each turbine is operable to generate electricity from a flow of the liquid through the set of pipes from the second plurality of modules to the first plurality of modules under a force of gravity.

Clause 25. The energy storage tower of Clause 23, wherein the set of pipes comprise a set of valves, the set of valves actuatable from a closed position to an open position, wherein when in the open position, the set of valves allow liquid flow to and from the first plurality of modules, and wherein when in the closed position, the set of valves disallow liquid flow to and from the first plurality of modules.

Clause 26. The energy storage tower of any of Clauses 23-24, wherein the plurality of pumps are positioned on a bottom floor of the energy storage tower.

Clause 27. The energy storage tower of any of Clauses 23-25, wherein the plurality of pumps are selectively actuatable to pump a desired amount of the liquid from the lower section to the upper section.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

The invention claimed is:

1. An energy storage structure, comprising:

a structure comprising:

a lower section comprising a first plurality of floors, each floor of the first plurality of floors is configured to be selectively filled with a liquid, and an upper section comprising a second plurality of floors, each floor of the second plurality of floors is configured to be selectively filled with a liquid;

a first plurality of pipes hydraulically coupling the first plurality of floors of the lower section with the second plurality of floors of the upper section, the first plurality of pipes defining a first path of liquid movement from the lower section to the upper section;

a second plurality of pipes hydraulically coupling the second plurality of floors of the upper section with the first plurality of floors of the lower section, the second plurality of pipes defining a second path of liquid movement from the upper section to the lower section, wherein the first plurality of pipes and the second plurality of pipes facilitate independent liquid movement between any floor of the first plurality of floors and any floor of the second plurality of floors;

a pump hydraulically coupled to the first plurality of pipes, the pump operable to pump the liquid from the lower section to the upper section to store energy as potential energy;

a turbine positioned along the second path of liquid movement and hydraulically coupled to the second plurality of pipes, the turbine operable to generate electricity from a flow of the liquid through the second plurality of pipes from the upper section to the lower section under a force of gravity; and a plurality of valves, each valve actuatable between a closed position and an open position.

2. The energy storage structure of claim 1, wherein the turbine is positioned vertically above a respective floor of the first plurality of floors and is configured to generate electricity as liquid flows through a corresponding pipe from the upper section to the lower section under the force of gravity.

3. The energy storage structure of claim 1, wherein the pumping of liquid and the generation of electricity from the flow of liquid are configured to maintain a substantially constant pressure differential across the pump and the turbine during operation.

4. The energy storage structure of claim 1, further comprising:

a further structure extending circumferentially about the structure, the further structure comprising one or more of a residential, industrial, or commercial space.

5. The energy storage structure of claim 1, wherein the structure comprises:

an intermediate section between the lower section and the upper section, the intermediate section comprising one or more of residential, industrial, or commercial spaces.

6. The energy storage structure of claim 1, wherein a first pipe of the first plurality of pipes hydraulically couples each floor of the first plurality of floors of the lower section.

7. The energy storage structure of claim 6, wherein a second pipe of the second plurality of pipes hydraulically couples each floor of the second plurality of floors of the upper section.

8. The energy storage structure of claim 1, further comprising:

a controller configured to electronically actuate the plurality of valves between the open position and the closed position.

9. The energy storage structure of claim 8, wherein the plurality of valves are operable by the controller to release liquid in discrete increments corresponding to individual floors.

10. The energy storage structure of claim 1, wherein a first pressure exerted on first walls of a first floor of the first plurality of floors is confined to the first floor, and a second pressure exerted on second walls of a second floor of the first plurality of floors is confined to the second floor.

11. An energy storage structure, comprising:

a structure comprising:

a lower section comprising a first plurality of modules configured to be filled with a liquid;

an upper section comprising a second plurality of modules, each module of the second plurality of modules is configured to be filled with the liquid;

a first plurality of pipes hydraulically coupling the first plurality of modules and the second plurality of modules, the first plurality of pipes defining a first path of liquid movement from the lower section to the upper section;

a second plurality of pipes hydraulically coupling the second plurality of modules of the upper section with the first plurality of modules of the lower section, the second plurality of pipes defining a second path of liquid movement from the upper section to the lower section, wherein the first plurality of pipes and the second plurality of pipes facilitate independent liquid movement between any module of the first plurality of modules and any module of the second plurality of modules;

a plurality of pumps hydraulically connected to the first plurality of modules; and a plurality of turbines, each of the plurality of turbines positioned along the second path and hydraulically coupled to the second plurality of pipes, wherein the plurality of pumps are operable to pump the liquid along the first path from one or more of the first plurality of modules to the second plurality of modules to store energy as potential energy, and wherein the plurality of turbines are operable to generate electricity from a flow of the liquid along the second path through the second plurality of pipes from the second plurality of modules to one or more of the first plurality of modules under a force of gravity; and a plurality of valves, each valve actuatable between a closed position and an open position.

12. The energy storage structure of claim 11, wherein each turbine is positioned vertically above at least one first module of the first plurality of modules and is configured to generate electricity as liquid flows through a corresponding pipe from the upper section to the lower section under the force of gravity.

13. The energy storage structure of claim 11, wherein the pumping of liquid and the generation of electricity from the flow of liquid are configured to maintain a substantially constant pressure differential across each pump and each turbine during operation.

14. The energy storage structure of claim 11, further comprising:

a further structure extending circumferentially about the structure, the further structure comprising one or more of a residential, industrial, or commercial space.

15. The energy storage structure of claim 11, wherein the structure comprises:

an intermediate section between the lower section and the upper section, the intermediate section comprising one or more of residential, industrial, or commercial spaces.

16. The energy storage structure of claim 11, wherein a first pipe of the first plurality of pipes hydraulically couples each module of the first plurality of modules of the lower section.

17. The energy storage structure of claim 16, wherein a second pipe of the second plurality of pipes hydraulically couples each module of the second plurality of modules of the upper section.

18. The energy storage structure of claim 11, further comprising:

a controller configured to electronically actuate the plurality of valves between the open position and the closed position.

19. The energy storage structure of claim 18, wherein the plurality of valves are operable by the controller to release liquid in discrete increments corresponding to individual module.

20. An energy storage structure, comprising:

a structure comprising:

a lower section comprising a first plurality of modules, each module of the first plurality of modules is configured to be filled with a liquid, and an upper section comprising a second plurality of modules, each module of the second plurality of modules is configured to be selectively filled with the liquid;

a first plurality of pipes hydraulically coupling the first plurality of modules and the second plurality of modules, the first plurality of pipes defining a first path from the lower section to the upper section;

a second plurality of pipes hydraulically coupling the second plurality of modules to the first plurality of modules, the second plurality of pipes defining a second path from the upper section to the lower section, wherein the first plurality of pipes and the second plurality of pipes facilitate independent liquid movement between any module of the first plurality of modules and any module of the second plurality of modules;

a plurality of pumps hydraulically connected to the first plurality of modules, the plurality of pumps are operable to pump the liquid along the first path from each module of the first plurality of modules to the second plurality of modules to store energy as potential energy; and a plurality of valves, each valve actuatable between a closed position and an open position.

* * * * *